(12) United States Patent
Suzuki et al.

(10) Patent No.: US 12,164,767 B2
(45) Date of Patent: Dec. 10, 2024

(54) SEMICONDUCTOR DEVICE

(71) Applicant: KIOXIA CORPORATION, Tokyo (JP)

(72) Inventors: Tomoaki Suzuki, Chigasaki Kanagawa (JP); Kazukuni Kitagaki, Sagamihara Kanagawa (JP)

(73) Assignee: Kioxia Corporation, Tokyo (JP)

( * ) Notice: Subject to any disclaimer, the term of this patent is extended or adjusted under 35 U.S.C. 154(b) by 164 days.

(21) Appl. No.: 17/900,074

(22) Filed: Aug. 31, 2022

(65) Prior Publication Data

US 2023/0305702 A1 Sep. 28, 2023

(30) Foreign Application Priority Data

Mar. 22, 2022 (JP) ................................. 2022-045999

(51) Int. Cl.
*G06F 3/06* (2006.01)
(52) U.S. Cl.
CPC .......... *G06F 3/0607* (2013.01); *G06F 3/0629* (2013.01); *G06F 3/0679* (2013.01)
(58) Field of Classification Search
None
See application file for complete search history.

(56) References Cited

U.S. PATENT DOCUMENTS

| 8,954,655 | B2 | 2/2015 | Jean et al. |
| 10,838,655 | B2 | 11/2020 | Kobayashi et al. |
| 2005/0060478 | A1* | 3/2005 | Wu ............... G06F 13/4027 710/306 |
| 2011/0276775 | A1 | 11/2011 | Schuetz |
| 2021/0132856 | A1* | 5/2021 | Chen ................. G11C 5/04 |

FOREIGN PATENT DOCUMENTS

| JP | 5665974 B2 | 2/2015 |
| JP | 6321682 B2 | 5/2018 |
| JP | 2019-057344 A | 4/2019 |

* cited by examiner

*Primary Examiner* — Charles Rones
*Assistant Examiner* — Ryan Dare
(74) *Attorney, Agent, or Firm* — Kim & Stewart LLP

(57) ABSTRACT

A semiconductor device includes terminals connectable to a host, first and second bridge chips connected to the terminals, first chips connected to the first bridge chip, and second chips connected to the second bridge chip. The terminals includes a first terminal through which a first signal designating a bridge chip is transmitted. The first bridge chip is configured to enable signal transmission to at least one of the first chips when the first signal designates the first bridge chip, and disable the signal transmission to the first chips when the first signal does not designate the first bridge chip. The second bridge chip is configured to enable signal transmission to at least one of the second chips when the first signal designates the second bridge chip, and disable the signal transmission to the second chips when the first signal does not designate the second bridge chip.

17 Claims, 13 Drawing Sheets

FIG. 12

| Input Cycle | DQ[7] | DQ[6] | DQ[5] | DQ[4] | DQ[3] | DQ[2] | DQ[1] | DQ[0] |
|---|---|---|---|---|---|---|---|---|
| Adr1 | | | IN-CHIP ADDRESS (Column Address) | | | | | |
| Adr2 | | | IN-CHIP ADDRESS (Column Address) | | | | | |
| Adr3 | | | IN-CHIP ADDRESS (Row Address) | | | | | |
| Adr4 | | | IN-CHIP ADDRESS (Row Address) | | | | | |
| Adr5 | CHIP IDENTIFIER | | IN-CHIP ADDRESS (Row Address) | | | | | |
| Adr6 | Don't Care | | | | BRIDGE IDENTIFIER | | | CHIP IDENTIFIER |

ADD42: Adr1–Adr5
ADD41: Adr6

SEMICONDUCTOR DEVICE

CROSS-REFERENCE TO RELATED APPLICATION(S)

This application is based upon and claims the benefit of priority from Japanese Patent Application No. 2022-045999, filed on Mar. 22, 2022, the entire contents of which are incorporated herein by reference.

FIELD

Embodiments described herein relate generally to a semiconductor device and a host device.

BACKGROUND

There is a semiconductor device in which a bridge chip is connected between a terminal group that can be connected to a host and a plurality of chips that are to be controlled by the host. In this semiconductor device, access to the plurality of chips from the host is performed via the bridge chip. For example, when the plurality of chips are memory chips for storing data, the number of memory chips may need to be increased according to an increased amount of data to be stored. When the number of memory chips increases, it is desirable that more memory chips are connected without increasing the number of interfaces to the host. Further, it is desirable that the access of the host to the plurality of chips is efficiently performed.

BRIEF DESCRIPTION OF THE DRAWINGS

FIG. 12 illustrates address information included in a command in the sixth modified example of the embodiment.

DETAILED DESCRIPTION

Embodiments provide a semiconductor device, a controller, and a host device capable of efficiently accessing a plurality of chips.

In general, according to an embodiment, a semiconductor device includes a plurality of terminals connectable to a host, first and second bridge chips connected to the plurality of terminals, a first plurality of chips connected to the first bridge chip, and a second plurality of chips connected to the second bridge chip. The plurality of terminals includes a first terminal through which a first signal designating a bridge chip is transmitted. The first bridge chip is configured to enable signal transmission to at least one of the first plurality of chips when the first signal designates the first bridge chip, and disable the signal transmission to the first plurality of chips when the first signal does not designate the first bridge chip. The second bridge chip is configured to enable signal transmission to at least one of the second plurality of chips when the first signal designates the second bridge chip, and disable the signal transmission to the second plurality of chips when the first signal does not designate the second bridge chip.

The semiconductor device according to the embodiment will be described in detail with reference to the accompanying drawings. It is noted that the present disclosure is not limited to the embodiment.

Embodiment

Figure 1:
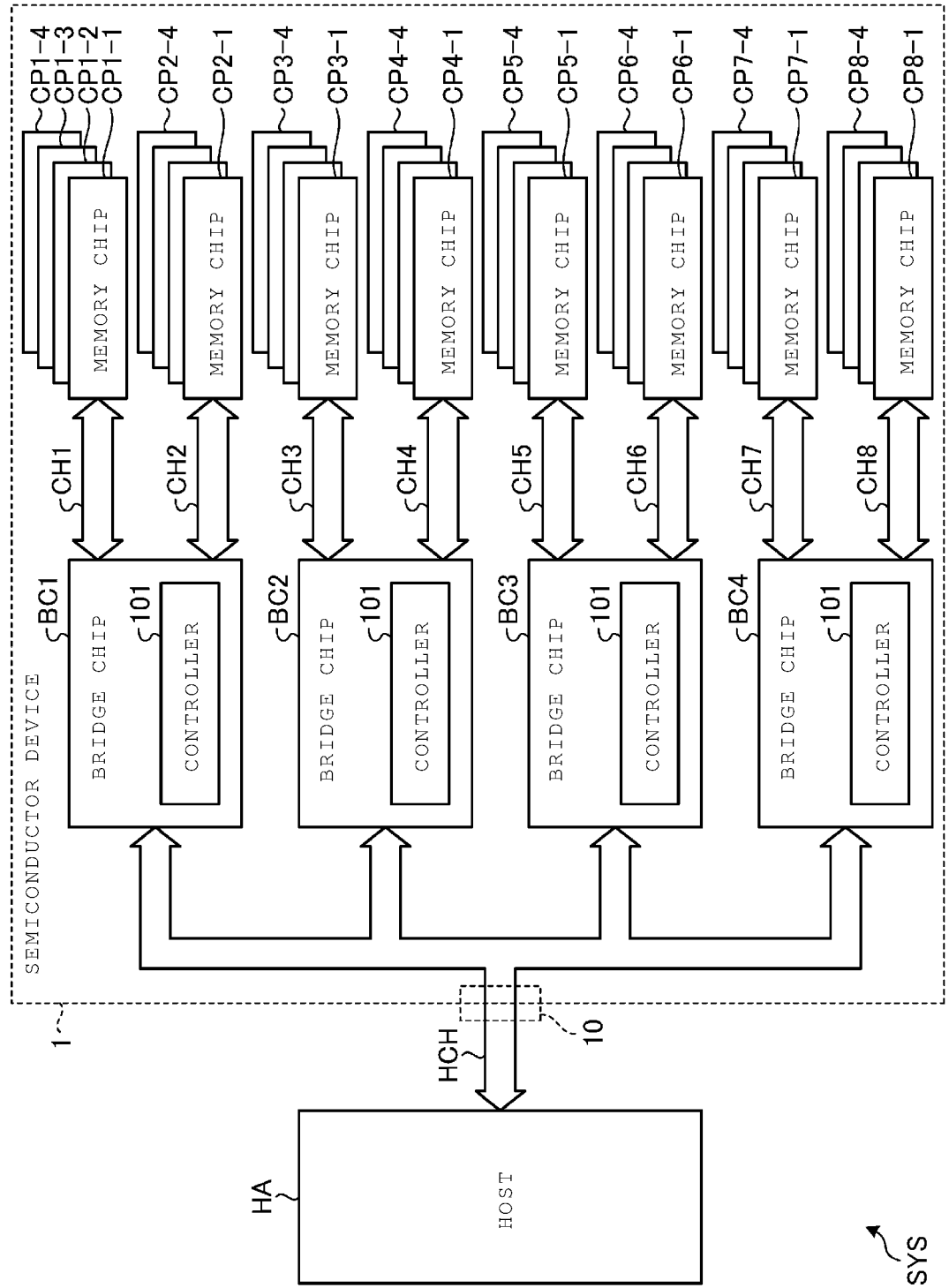
FIG. 1 is a block diagram illustrating a configuration of a storage system including a semiconductor device according to an embodiment.

A semiconductor device, a controller, and a host device according to an embodiment are configured such that a plurality of bridge chips are connected between terminals connectable to the host device and a plurality of chips. According to the embodiment, the semiconductor device is provided for efficiently accessing the plurality of chips via the plurality of bridge chips. A semiconductor device 1 according to the embodiment may be configured as illustrated in FIG. 1. FIG. 1 is a block diagram illustrating a schematic configuration of a storage system SYS including the semiconductor device 1 according to the embodiment.

The storage system SYS includes a host HA and the semiconductor device 1. The semiconductor device 1 includes a plurality of bridge chips BC1 to BC4 and a plurality of memory chips CP1-1 to CP1-4, CP2-1 to CP2-4, CP3-1 to CP3-4, CP4-1 to CP4-4, CP5-1 to CP5-4, CP6-1 to CP6-4, CP7-1 to CP7-4, and CP8-1 to CP8-4. When these bridge chips BC1 to BC4 are not distinguished, the bridge chips BC1 to BC4 are simply referred to as bridge chips BC. When these memory chips CP1-1 to CP1-4, CP2-1 to CP2-4, CP3-1 to CP3-4, CP4-1 to CP4-4, CP5-1 to CP5-4, CP6-1 to CP6-4, CP7-1 to CP7-4, and CP8-1 to CP8-4 are not distinguished, they are simply referred to as chips CP. Each of the bridge chips BC includes a controller 101. The controller 101 controls operations of the bridge chip BC.

The semiconductor device 1 can be connected to the host HA via a channel HCH. The plurality of bridge chips BC1 to BC4 in the semiconductor device 1 share a terminal group 10. The plurality of bridge chips BC1 to BC4 can be connected to the host HA via the terminal group 10 and the channel HCH.

Each bridge chip BC is connected to a plurality of chips via a plurality of channels. For example, the bridge chip BC1 is connected to the chips CP1-1 to CP1-4 via a channel CH1 and is connected to the chips CP2-1 to CP2-4 via a channel CH2. The bridge chip BC4 is connected to the chips CP7-1 to CP7-4 via a channel CH7 and is connected to the chips CP8-1 to CP8-4 via a channel CH8. When these channels CH1 to CH8 are not distinguished, the channels CH1 to CH8 are simply referred to as channels CH.

In FIG. 1, the number of chips CP connected to each bridge chip BC via each channel CH is 4. The number is not limited to 4, but may be 1 to 3 and may be 5 or more.

Further, each chip CP may be a memory chip. The chip CP may be a non-volatile memory chip such as a NAND flash memory or may be a volatile memory chip such as a DRAM. In the following, a case where the chip CP is a non-volatile memory chip will be described as an example.

In the following, each chip CP will be referred to a memory chip CP, and a case where the chip CP is a memory chip will be mainly described. Further, in order to distinguish the channels from each other, the channel HCH between the host HA and the semiconductor device 1 may be referred to as a host channel HCH, and the channel CH between the bridge chip BC and the memory chip CP may be referred to as a local channel CH.

The host HA may be a processor that is provided in an electronic device such as a computer or a mobile terminal and controls a semiconductor device 1 or may be a device such as a controller. When the host HA is a processor of an electronic device, the channel HCH may be a wired communication path such as a serial bus.

When the host HA is a device such as a controller and is mounted on the same board as the semiconductor device 1, the channel HCH may be a board wiring.

When the host HA is a device such as a controller and is mounted in the same package as the semiconductor device 1, the channel HCH may be a bonding wire, a ball electrode, a through via (TSV), or the like.

The channel HCH to the host HA and each channel CH in the semiconductor device 1 may be configured based on a predetermined standard. When each memory chip CP is a NAND flash memory, the predetermined standard is, for example, a toggle DDR standard, and the channel HCH and each channel CH function as a toggle DDR interface.

In the storage system SYS including the semiconductor device 1 of the present embodiment, the plurality of bridge chips BC1 to BC4 share one terminal group 10 and one channel HCH in order to connect to the host HA. For this reason, in order for the host HA to access the plurality of memory chips CP1 to CP8 via the plurality of bridge chips BC1 to BC4, the semiconductor device 1 according to the present embodiment is configured so that one bridge chip BC to be accessed can be designated among the plurality of bridge chips BC1 to BC4.

Figure 2:
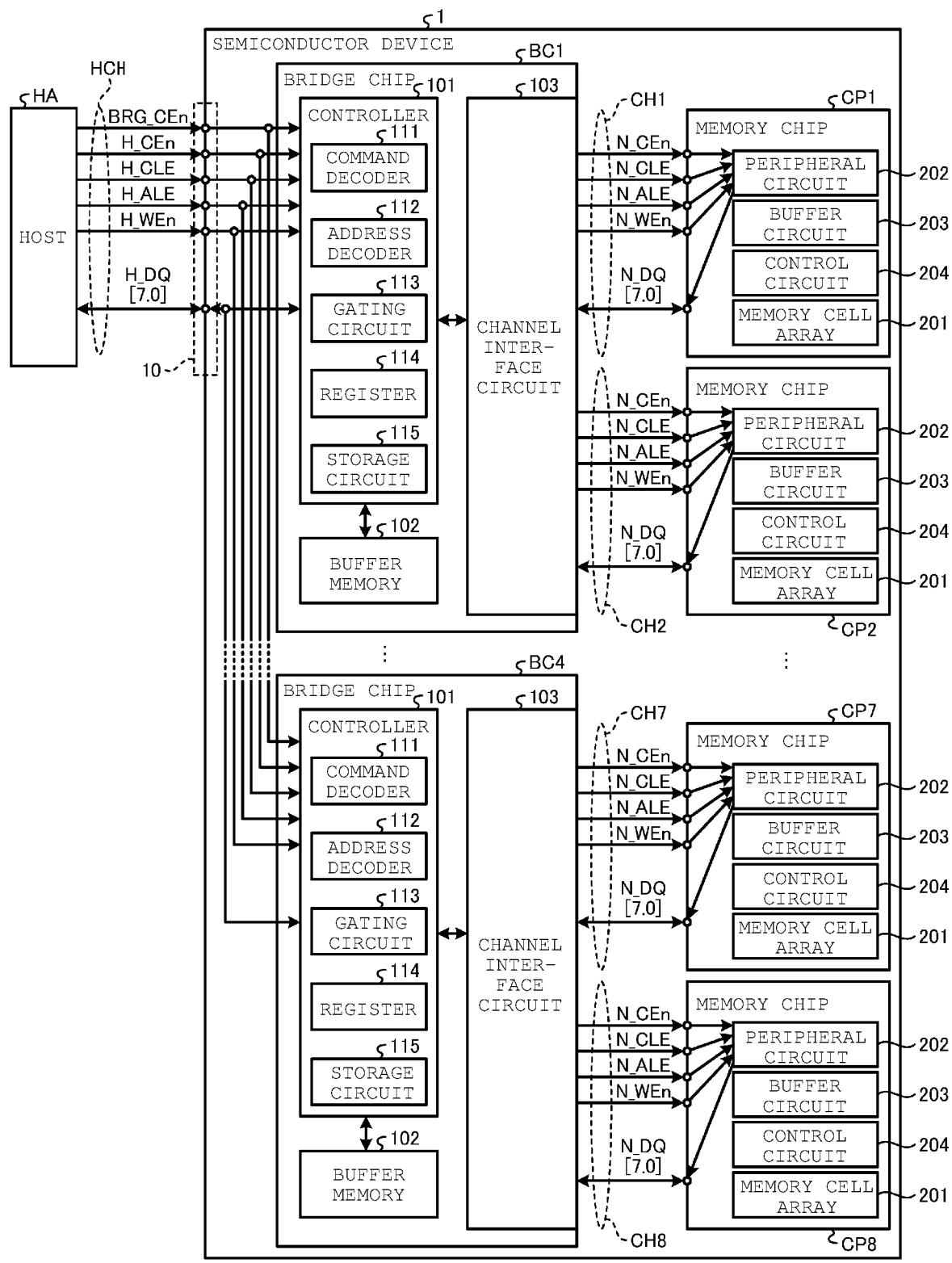
FIG. 2 is a block diagram illustrating a configuration of the semiconductor device according to the embodiment.

For example, as illustrated in FIG. 2, a signal line for a bridge chip enable signal BRG_CEn is provided in the channel HCH, so that one bridge chip BC is designated when the bridge chip enable signal BRG_CEn is set to an active state (for example, L level). FIG. 2 is a block diagram illustrating the configuration of the semiconductor device 1. That is, each bridge chip BC has a function for interpreting address information (for example, a bridge number) of the bridge chip BC while the bridge chip enable signal BRG_CEn is in an active state. Accordingly, when the host HA accesses the target memory chip CP, the host HA can access the target memory chip CP via one bridge chip BC selected with the address information among the plurality of bridge chips BC1 to BC4. As a result, as compared with a case where all the memory chips CP are accessed via all the bridge chips BC, access concentration on one bridge chip can be reduced, and the target memory chip CP can be efficiently accessed.

In FIG. 2, for simplification of the illustration, one memory chip CP1 representing the memory chips CP1-1 to CP1-4, one memory chip CP2 representing the memory chips CP2-1 to CP2-4, one memory chip CP7 representing the memory chips CP7-1 to CP7-4, and one memory chip CP8 representing the memory chips CP8-1 to CP8-4 are illustrated. It is noted that, hereinafter, in some cases, the memory chips CP1 to CP8 may be collectively referred to as memory chips CP.

The host channel HCH includes a signal line for transferring the bridge chip enable signal BRG_CEn, a signal line for transferring a chip enable signal H_CEn, a signal line for transferring a command latch signal H_CLE, a signal line for transferring an address latch signal H_ALE, a signal line for transferring a write enable signal H_WEn, and a signal line group for transferring a data signal H_DQ[7:0]. The signal line group for transferring a data signal H_DQ[7:0] may be an 8-bit width bus wiring line. The terminal group 10 includes a terminal for each signal line provided in the channel HCH and receives the corresponding signal by this terminal. It is noted that "n" at the end of the code representing a signal indicates that the signal is a signal operated by negative logic. It can be freely designed whether each signal is operated with negative logic (that is, low active) or operated with positive logic (that is, high active). In the case of FIG. 2, the bridge chip enable signal BRG_CEn, the chip enable signal H_CEn, and a write enable signal H_WEn are low active signals. The command latch signal H_CLE and the address latch signal H_ALE are high-active signals.

The chip enable signal H_CEn is a signal for allowing the memory chip CP that is an access target to be in an enabled state. A command latch enable signal H_CLE is a signal indicating that the data signal H_DQ[7:0] is a command. The address latch enable signal ALE is a signal indicating that the data signal H_DQ[7:0] is an address. The write enable signal H_WEn is a signal instructing a counterpart device to take in the command or address transmitted with the data signal H_DQ[7:0].

The bridge chip enable signal BRG_CEn is a signal that is turned on when information (for example, address information) for controlling the bridge chip BC is transmitted. Each bridge chip BC can interpret the received address information in a period during which the bridge chip enable signal BRG_CEn is in an active state. Interpreting the address information includes determining whether to execute the subsequent processing according to the address information.

For example, each of the bridge chips BC1 to BC4 receives the address information for designating one bridge chip BC in the period during which the bridge chip enable signal BRG_CEn is in an active state. When the bridge chip enable signal BRG_CEn is in an active state, each of the bridge chips BC1 to BC4 blocks (gates) the transfer of the signal received from the host HA to the memory chip CP. After that, each of the bridge chips BC1 to BC4 determines whether the own bridge chip BC is designated according to the received address information. Each of the bridge chips BC1 to BC4 disables the gating when the own bridge chip BC is designated, and each of the bridge chips BC1 to BC4 continues the gating when the own bridge chip BC is not designated.

Hereinafter, a period during which information (for example, address information) for controlling the bridge chip BC is transmitted from the host HA to the bridge chip BC is referred to as a bridge control period.

Each local channel CH can be used to transmit and receive the same kind of signal group as the signal group excluding the bridge chip enable signal BRG_CEn among the signals transmitted and received between the host HA and the bridge chip BC. That is, each local channel CH has a signal line for transferring a chip enable signal N_CEn, a signal line for transferring a command latch signal N_CLE, a signal line for transferring an address latch signal N_ALE, a signal line for transferring a write enable signal N_WEn, and a signal line group for transferring a data signal N_DQ[7:0]. The signal line group for transferring the data signal N_DQ[7:0] may be an 8-bit width bus wiring line.

The bridge chips BC1 to BC4 are commonly connected to the host channel HCH. In the host channel HCH, the host HA and the terminal group 10 are connected with a common wiring line, and the terminal group 10 and each bridge chip BC are connected with a branched wiring. In the bridge chips BC1 to BC4, the signal line for transferring the bridge chip enable signal BRG_CEn, the signal line for transferring the chip enable signal N_CEn, the signal line for transferring the command latch signal N_CLE, the signal line for transferring the address latch signal N_ALE, the signal line for transferring the write enable signal N_WEn, and the signal line group for transferring the data signal N_DQ[7:0] are commonly connected.

The bridge chip BC includes the controller 101, a buffer memory 102, and a channel interface 103. The bridge chip BC includes an interface circuit (not illustrated) that is connected to the controller 101 and processes a plurality of signals transferred via the host channel HCH.

The buffer memory 102 is a memory in which data transferred between the host HA and the memory chip CP is temporarily stored (i.e., buffered). The buffer memory 102 may be configured with a dynamic random access memory (DRAM) or may be configured with a static random access memory (SRAM). It is noted that the type of memory including the buffer memory 102 is not limited to these.

The channel interface 103 communicates information with the memory chip CP via the local channel CH. The channel interface 103 transfers commands, addresses, data, or the like supplied from the controller 101 to the memory chip CP via the local channel CH and stores data or the like supplied from the memory chip CP via the local channel CH in the buffer memory 102 or supplies the data or the like to controller 101.

For example, the channel interface 103 can supply the chip enable signal N_CEn, the command latch signal N_CLE, the address latch signal N_ALE, the write enable signal N_WEn, and the data signal N_DQ[7:0] input to the terminal group 10 via the local channel CH to the memory chip CP.

The controller 101 is located between the terminal group 10 and the channel interface 103. The controller 101 uses the buffer memory 102 to control the exchange of information between the terminal group 10 and the channel interface 103. The controller 101 has a function of storing the address information (for example, the bridge number) of the own bridge chip BC and interpreting the address information designating the bridge chip BC.

The controller 101 has a command decoder 111, an address decoder 112, a gating circuit 113, a register 114, and a storage circuit 115.

The command decoder 111 interprets the command received from the host HA via the terminal group 10. The command decoder 111 can issue a command with respect to the memory chip CP according to the interpretation result.

The address decoder 112 can interpret the address information received from the host HA via the terminal group 10 during the bridge control period. The address decoder 112 may interpret the address information first received in the bridge control period as address information ADD1 designating a bridge chip BC. Alternatively, in the bridge control period, the address decoder 112 may interpret the received address information is the address information ADD1 designating a bridge chip BC if the received address information includes a code indicating that the address information is designating a bridge chip BC.

The address information ADD1 designating a bridge chip BC is information that designates a bridge chip BC to be accessed among the plurality of bridge chips BC1 to BC4. For the interpretation of the address information ADD1, the address decoder 112 decodes the address information ADD1 and reads and decodes the address information of the own bridge chip BC from the storage circuit 115. The decoding result of the address information ADD1 and the decoding result of the address information of the own bridge chip BC are compared, and a comparison result is supplied to the gating circuit 113. The comparison result indicates whether the own bridge chip BC is designated and can be regarded as the determination result of whether the own bridge chip BC is designated.

For example, when the decoding result of the address information ADD1 and the decoding result of the address information of the own bridge chip BC match, the address decoder 112 generates a comparison result having a value (for example, "1") indicating that the own bridge chip BC is designated and supplies the comparison result to the gating circuit 113. When the decoding result of the address information ADD1 and the decoding result of the address information of the own bridge chip BC do not match, the address decoder 112 generates a comparison result having a value (for example, "0") indicating that the own bridge chip BC is not designated and supplies the comparison result to the gating circuit 113.

The gating circuit 113 is a circuit capable of gating (i.e., blocking) the supply of signals to the memory chip CP. The gating circuit 113 gates the supply of the signal to the memory chip CP with respect to the signal received from the host HA when the bridge chip enable signal BRG_CEn is in an active state. The gating circuit 113 can transition between a first state and a second state according to the comparison result of comparing the decoding result of the address information ADD1 and the decoding result of the address information of the own bridge chip BC. The first state is a state in which the gating is disabled and thus a signal received from the host HA is transferred to the memory chip CP. The second state is a state in which the gating is enabled and thus the transfer of the signal received from the host HA to the memory chip CP is blocked.

For example, it is assumed that the gating circuit 113 is in the second state. When the gating circuit 113 receives a comparison result having a value (for example, indicating that the own bridge chip BC is designated, the gating circuit 113 disables the gating of the signal to the memory chip CP for the signal received from the host HA according to the comparison result and transitions from the second state to the first state. When the gating circuit 113 receives a comparison result having a value (for example, "0") indicating that the own bridge chip BC is not designated, the gating circuit 113 continues the gating of the signal received from the host HA to the memory chip CP according to the comparison result and maintain the second state.

The gating circuit 113 may be implemented with a logic circuit such as a logic product circuit. It is noted that the configuration of the gating circuit 113 is not limited to this. That is, the gating circuit 113 is implemented with any circuit that can switch between a state of disabling the gating and a state of enabling the gating based on the bridge chip enable signal BRG_CEn and the comparison result.

The register 114 is a memory in which various information (referred to as operation control information) for controlling operations of the bridge chip BC is stored.

The operation control information is not limited to specific information. For example, the operation control information may be setting information used for controlling the bridge chip BC. The setting information is transmitted from the host HA and stored in the bridge chip BC. The controller 101 executes operations according to the setting information.

The operation control information may be status information of the bridge chip BC. When the operation (for example, read) instructed by the host HA has progressed up to a certain point, the bridge chip BC stores progress information indicating that fact as the status information in the register 114. By referring to the status information in the register 114, the host HA can recognize a progress situation of the instructed operation and determine a timing of instructing the next operation to the plurality of memory chips CP.

The storage circuit 115 stores the address information (for example, the bridge number) of the own bridge chip BC. The storage circuit 115 may be implemented with a hardwired circuit. When implemented with the hardwired circuit, the storage circuit 115 has a plurality of lines connected to a fixed potential corresponding to the address information. The fixed potential can be set to a power supply potential when the fixed potential corresponds to a bit value of "1", and the fixed potential can be set to a ground potential when the fixed potential corresponds to a bit value of "0". The power supply potential is a potential of the power supply voltage supplied when the storage circuit 115 operates. The ground potential is a reference potential when the storage circuit 115 operates.

For example, when storing the bridge number of "0001b" ("1" in decimal notation), the storage circuit 115 has lines L1, L2, and L3 connected to the ground potential and line L4 connected to the power supply potential. When storing the bridge number of "1000b" ("8" in decimal notation), the storage circuit 115 has the line L1 connected to the power supply potential and the lines L2, L3, and L4 connected to the ground potential.

It is noted that the storage circuit 115 may be implemented with a fusing type e-fuse circuit. When implemented with a fusing type e-fuse circuit, the storage circuit 115 has a plurality of fuse elements. Before the operation of the semiconductor device 1, a large current is selectively passed through the fuse element corresponding to the address information among the plurality of fuse elements to be fused and cut. Accordingly, the address information of the own bridge chip BC is stored in the storage circuit 115.

Alternatively, the storage circuit 115 may be implemented with a dielectric breakdown type e-fuse circuit. When implemented with the dielectric breakdown type e-fuse circuit, the storage circuit 115 has a plurality of fuse elements. Before the operation of the semiconductor device 1, a large voltage is selectively applied to the fuse element corresponding to the address information among the plurality of fuse elements, so that the gate is dielectrically broken down. Accordingly, the address information of the own bridge chip BC is stored in the storage circuit 115.

Each memory chip CP includes a memory cell array 201, a peripheral circuit 202, a buffer circuit 203, and a control circuit 204.

The memory cell array 201 includes a plurality of blocks. Each block is, for example, a collection of non-volatile memory cell transistors. Each memory cell transistor is associated with a row and a column and can store data non-volatilely. All data stored in one block can be collectively erased.

During a read operation or a write operation on the memory cell array 201, a group of memory cell transistors sharing a row is collectively selected, and the read operation and the write operation are collectively executed on the group of selected memory cell transistors. The minimum unit of the read operation and the write operation with respect to the memory cell array 201 is referred to as a page. When each memory cell transistor can store one bit of data, the group of memory cell transistors sharing the row has a storage capacity of one page. When each memory cell transistor can store two or more bits of data, the group of memory cell transistors sharing the row has a storage capacity of two or more pages.

The memory cell array 201 is connected to the buffer circuit 203 via the control circuit 204, and the control circuit 204 is connected to the peripheral circuit 202 via the buffer circuit 203.

The control circuit 204 includes a row decoder, a column decoder, and a sense amplifier. The peripheral circuit 202 includes a sequencer, a command register, an address register, a status register, a feature register, and the like. The control circuit 204, the buffer circuit 203, and the peripheral circuit 202 are located around the memory cell array 201. The peripheral circuit 202 is electrically connected to the channel CH. The peripheral circuit 202 controls the operation (for example, the operation related to the read, the operation related to the write, the operation of acquiring information, and the operation of state transition) of the memory cell array 201 to each memory cell by using the buffer circuit 203 and the control circuit 204 according to a command received from the bridge chip BC via the channel CH.

The buffer circuit 203 is a buffer memory for data transfer between the channel CH and the control circuit 204. The peripheral circuit 202 reads data from the memory cell array 201 via the control circuit 204 according to a data read command received from the bridge chip BC to temporarily store the data in the buffer circuit 203. Therefore, the buffer circuit 203 has a capacity corresponding to a minimum unit of the read operation with respect to the memory cell array 201, that is, a storage capacity for one page. It is noted that the operation of reading data from the memory cell array 201 and storing the data in the buffer circuit 203 is referred to as a sense operation.

The peripheral circuit 202 can supply the data stored in the buffer circuit 203 to the bridge chip BC or to the memory cell array 201 according to the command received from the bridge chip BC.

Figure 3:
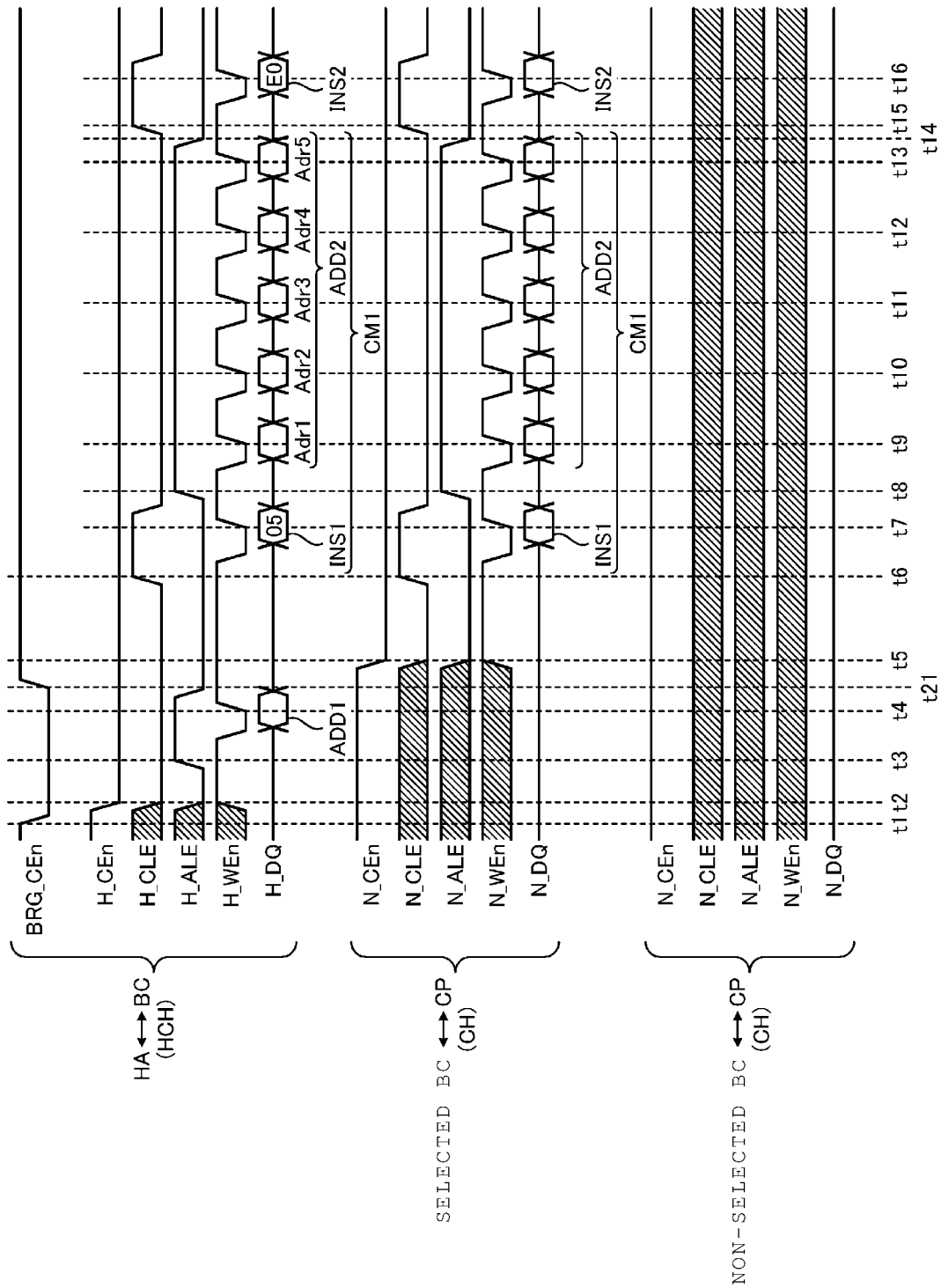
FIG. 3 is a waveform diagram illustrating operations of the semiconductor device according to the embodiment.

Next, the operations of the semiconductor device 1 will be described with reference to FIG. 3. FIG. 3 is a waveform diagram illustrating operations of the semiconductor device 1 according to the present embodiment. FIG. 3 illustrates the operations of the semiconductor device 1 when the host HA transmits the address information including the address information ADD 1 designating a bridge chip BC.

At a timing t1, the host HA transitions the bridge chip enable signal BRG_CEn to an active state (L level) and transmits the bridge chip enable signal BRG_CEn to each bridge chip BC via the host channel HCH. Accordingly, the host HA enables each of the bridge chips BC1 to BC4 and starts the bridge control period. Accordingly, each of the bridge chips BC1 to BC4 is in the state in which the chip enable signal H_CEn, the command latch enable signal H_CLE, the address latch enable signal H_ALE, the write enable signal H_WEn, and the data signal H_DQ are acceptable. Herein, "acceptable" includes that processing according to the received signal can be executed.

At a timing t2, the host HA transitions the chip enable signal H_CEn to an active state (L level) and transmits the chip enable signal H_CEn to each bridge chip BC via the host channel HCH. With this, the host HA transitions the command latch enable signal H_CLE, the address latch enable signal H_ALE, and the write enable signal H_WEn to a non-active state.

At a timing t3, the host HA transitions the address latch enable signal H_ALE to an active state (H level) and transmits the address latch enable signal H_ALE to each bridge chip BC via the host channel HCH. With this, the host HA transmits the address information ADD1 as the data signal H_DQ to the bridge chips BC1 to BC4 and toggles the write enable signal H_WEn. The write enable signal H_WEn functions as a strobe signal for each bridge chip BC1 to BC4 to sample the data signal H_DQ.

At this time, each of the bridge chips BC1 to BC4 gates the chip enable signal H_CEn, the command latch enable signal H_CLE, the address latch enable signal H_ALE, the write enable signal H_WEn, and the data signal H_DQ. Therefore, each signal does not appear on each local channel CH.

At a timing t4, each of the bridge chips BC1 to BC4 samples the address information ADD1 on the signal line of the data signal H_DQ in synchronization with the rising edge of the write enable signal H_WEn, interprets the address information ADD1, and determines whether the own bridge chip BC is designated. When the data signal H_DQ is 8 bits, the address information ADD1 may be 8 bits.

For example, when the bridge chip BC1 is designated by the address information ADD1, the bridge chip BC1 determines that the own bridge chip BC is designated (i.e., it is a selected bridge chip), and the bridge chips BC2 to BC4 determine that the own bridge chip BC is not designated (i.e., it is a non-selected bridge chip).

At a timing t21, the host HA transitions the bridge chip enable signal BRG_CEn from an active state (L level) to a non-active state (H level) according to the elapse of a predetermined time after the transmission of the address information ADD1 is completed. Accordingly, the host HA continues to enable a selected bridge chip BC1, but the host HA disables non-selected bridge chips BC2 to BC4 and ends the bridge control period. Further, the host HA transitions the address latch enable signal H_ALE to a non-active state (L level).

After a timing t5, each of the non-selected bridge chips BC2 to BC4 continues to gate the chip enable signal H_CEn, the command latch enable signal H_CLE, the address latch enable signal H_ALE, the write enable signal H_WEn, and the data signal H_DQ. The local channels CH3 to CH8 corresponding to the non-selected bridge chips BC2 to BC4 continue to be in the state where each signal does not appear.

On the other hand, the selected bridge chip BC1 operates as follows.

At the timing t5, the selected bridge chip BC1 transitions the chip enable signal N_CEn for the target memory chip CP to an active state (L level) according to an active state (L level) of the chip enable signal H_CEn and the designation of the own bridge chip BC by the address information ADD1 and supplies the chip enable signal N_CEn to the target memory chip CP via the local channel CH. With this, the selected bridge chip BC1 disables the gating of the command latch enable signal H_CLE, the address latch enable signal H_ALE, the write enable signal H_WEn, and the data signal H_DQ according to a non-active state of the bridge chip enable signal BRG_CEn. Accordingly, the local channels CH1 and CH2 corresponding to the bridge chip BC1 are in a state in which each signal corresponding to each of the plurality of signals transferred via the host channel HCH can appear.

At a timing t6, the host HA transitions the command latch enable signal H_CLE to an active state (H level). A host HA starts transmitting a command CM1 including instruction information INS1 and address information ADD2. The instruction information INS1 may be a write instruction instructing to write data into the memory cell array 201 or may be a read instruction instructing to read data from the memory cell array 201. That is, the host HA transmits the instruction information INS1 as the data signal H_DQ to the bridge chips BC1 to BC4 and toggles the write enable signal H_WEn.

At a timing t7, the selected bridge chip BC1 samples the instruction information INS1 in synchronization with a rising edge of the write enable signal H_WEn according to an active state of the command latch enable signal H_CLE. The selected bridge chip BC1 interprets a sampling result of the instruction information INS1, which is an instruction for an operation (for example, an operation related to writing, an operation related to reading, an operation of information acquisition, an operation of state transition), to the target memory chip CP. The selected bridge chip BC1 supplies the instruction for an operation to the target memory chip CP as the data signal N_DQ via the local channel CH. After that, the host HA transitions the command latch enable signal H_CLE to a non-active state (L level).

At a timing t8, the host HA transitions the address latch enable signal H_ALE to an active state (H level) and transmits the address latch enable signal H_ALE to each bridge chip BC via the host channel HCH. After that, the host HA toggles the write enable signal H_WEn.

At timings t9 to t13, the host HA transmits respective address words Adr1 to Adr5 included in the address information ADD2 as the data signals H_DQ to the respective bridge chips BC1 to BC4. It is noted that the number of address words included in the address information ADD2 is not limited to 5, and may be 4 or less or may be 6 or more. The selected bridge chip BC1 samples and interprets each of the address words Adr1 to Adr5 in synchronization with rising edges of the write enable signal H_WEn according to an active state (H level) of the address latch enable signal H_ALE. The selected bridge chip BC1 supplies an interpretation result of the address information ADD2 to the target memory chip CP as the data signal N_DQ via the local channel CH. Among the memory chips CP1 and CP2, the memory chip CP corresponding to the active chip enable signal N_CEn samples and interprets the address information ADD2 supplied as the data signal N_DQ.

At a timing t14, the host HA transitions the address latch enable signal H_ALE to a non-active state (L level).

At a timing t15, the host HA transitions the command latch enable signal H_CLE to an active state (H level).

At a timing t16, the selected bridge chip BC1 samples and interprets instruction information INS2 in synchronization with a rising edge of the write enable signal H_WEn according to an active state of the command latch enable signal H_CLE. The selected bridge chip BC1 supplies an interpretation result of the instruction information INS2 to the target memory chip CP as the data signal N_DQ via the local channel CH. Among the memory chips CP1 and CP2, the memory chip CP corresponding to the chip enable signal N_CEn, which is in an active state, samples and interprets the instruction information INS2 and outputs the data stored in the buffer circuit 203 according to, for example, the instruction information INS2.

As described above, in the semiconductor device 1 according to the present embodiment, the plurality of bridge chips BC1 to BC4 are commonly connected to the terminal group 10, and each bridge chip BC is connected to a plurality of memory chips CP corresponding thereto. Accordingly, it is possible to easily connect more memory chips CP to one interface while reducing an increase in an access to one bridge chip from the host HA. As a result, the storage capacity of the semiconductor device 1 can be easily increased.

Further, in the present embodiment, in the semiconductor device 1, each bridge chip BC has a function for interpreting the address information (for example, the bridge number) that designates a bridge chip BC according to an active state of the bridge chip enable signal BRG_CEn. Accordingly, the host HA can access a target memory chip CP via the bridge chip BC designated by the address information among the plurality of bridge chips BC1 to BC4. As a result, as compared with the case of accessing all the memory chips CP via all the bridge chips BC, an access concentration on one bridge chip can be reduced. Further as compared with the case of providing the terminal of the bridge chip enable signal BRG_CEn for each bridge chip BC, the number of the terminals and signal lines can be reduced. Accordingly, the target memory chip CP can be efficiently accessed.

Figure 4:
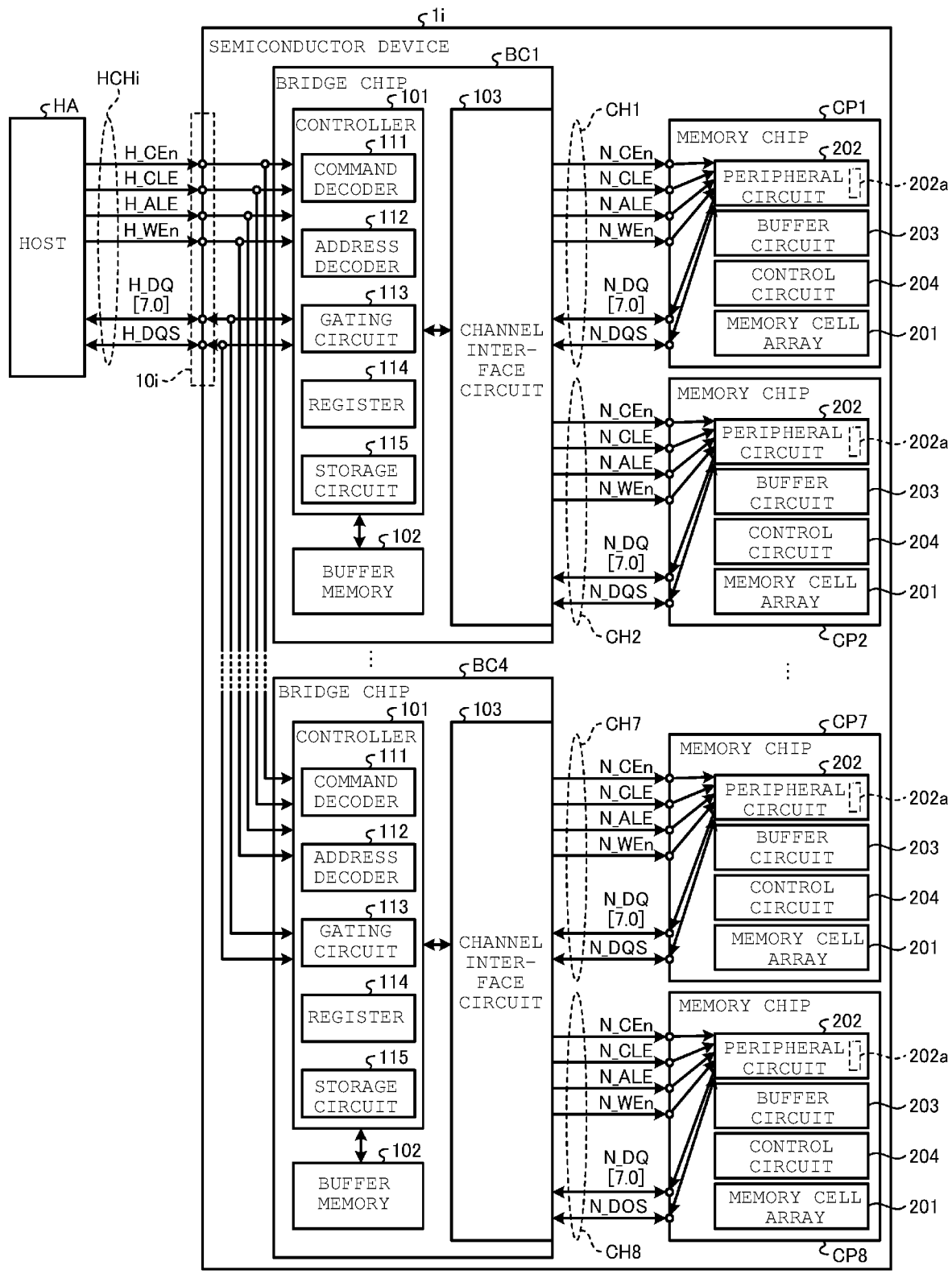
FIG. 4 is a block diagram illustrating a configuration of a semiconductor device according to a first modified example of the embodiment.

It is noted that as a first modified example of the above embodiment, the bridge control period may be controlled with a bridge control start command CM21 and a bridge control end command CM22 instead of the bridge chip enable signal BRG_CEn. In this case, as illustrated in FIG. 4, a host channel HCHi does not include the signal line of the bridge chip enable signal BRG_CEn, and a terminal group 10i of a semiconductor device 1i does not include the terminal for the bridge chip enable signal BRG_CEn. FIG. 4 is a block diagram illustrating a configuration of the semiconductor device 1i according to the first modified example of the above embodiment.

Each of the bridge control start command CM21 and the bridge control end command CM22 can be specified as a specific command to which one of vender-specific command values is assigned. In the data communication standard between the host HA and the semiconductor device 1, the actual operation for all command values is not defined. Vendors can assign command values with command values undefined by the operation to any control, which is referred to as vendor specific. It is possible to assign such a command value to a command that controls the operation of the bridge chip BC.

The command decoder 111 of the controller 101 in each of the bridge chips BC1 to BC4 can interpret the bridge control start command CM21 as a command instructing the start of the bridge control period and can interpret the bridge control end command CM22 as a command instructing the end of the bridge control period.

Further, the controller 101 in each of the bridge chips BC1 to BC4 can store an internal bridge chip enable signal IBRG_CEn as an internal signal instead of the bridge chip enable signal BRG_CEn. For example, in the controller 101 of each of the bridge chips BC1 to BC4, an internal bridge chip enable signal IBRG_CEn may be stored in the register 114. The controller 101 can transition the internal bridge chip enable signal IBRG_CEn in the register 114 between a non-active state (H level) and an active state (L level) according to the bridge control start command CM21 and the bridge control end command CM22.

The controller 101 can interpret the address information ADD1 that designates a bridge chip BC in the period from the reception of the bridge control start command CM21 to the reception of the bridge control end command CM22.

Figure 5:
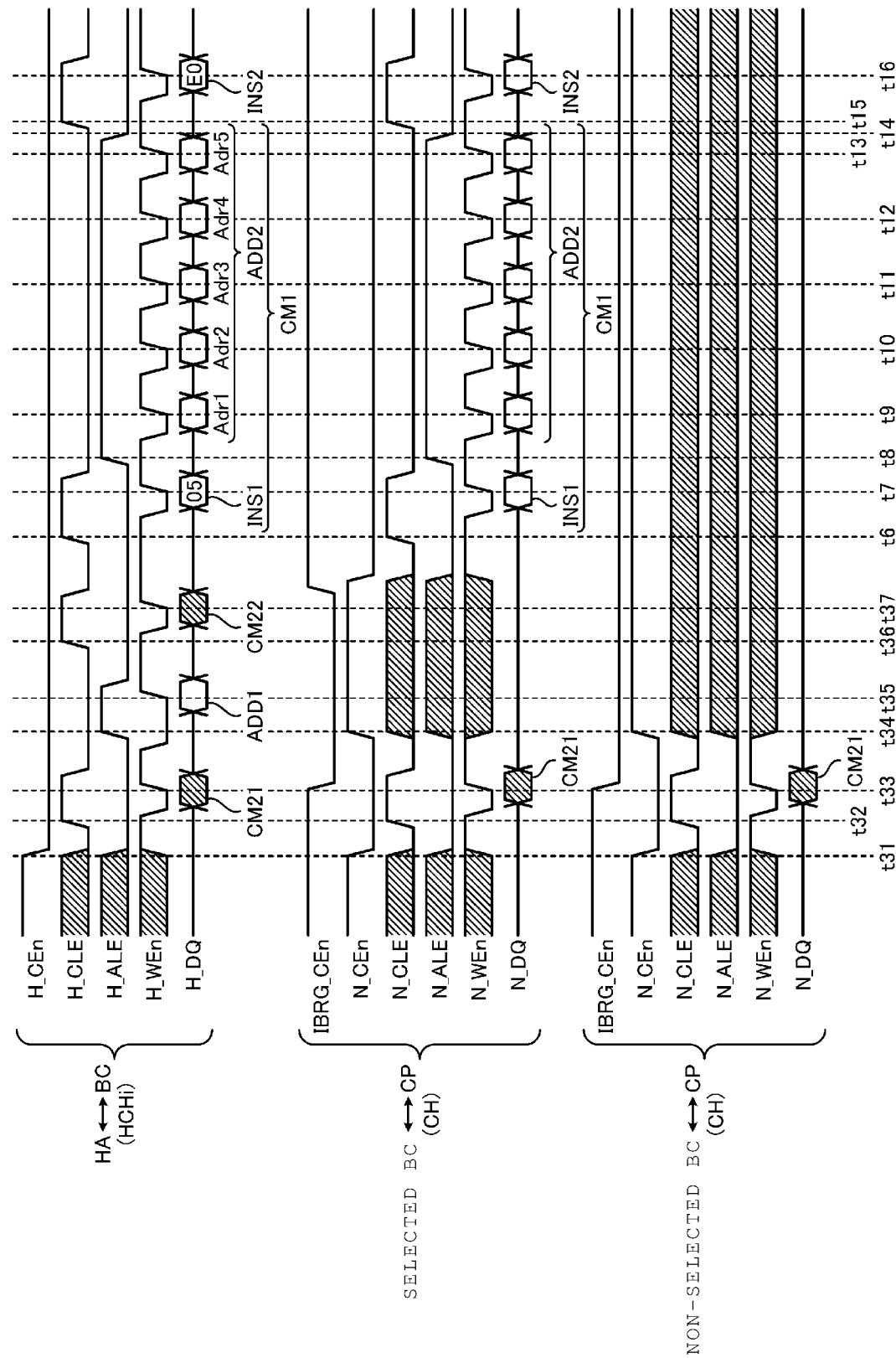
FIG. 5 is a waveform diagram illustrating operations of the semiconductor device according to the first modified example of the embodiment.

For example, as illustrated in FIG. 5, operations different from those of the above embodiment in the following aspects are performed. FIG. 5 is a waveform diagram illustrating operations of the semiconductor device 1i according to the first modified example of the above embodiment.

At a timing t31, the host HA transitions the chip enable signal H_CEn to an active state (L level) and transmits the chip enable signal H_CEn to each bridge chip BC via the host channel HCHi. Each bridge chip BC transitions the chip enable signal N_CEn to an active state (L level) according to an active state (L level) of the chip enable signal H_CEn and supplies the chip enable signal N_CEn to the target memory chip CP via the local channel CH. Further, each bridge chip BC temporarily disables the gating of the command latch enable signal H_CLE, the address latch enable signal H_ALE, the write enable signal H_WEn, and the data signal H_DQ.

Further, the host HA transitions the command latch enable signal H_CLE, the address latch enable signal H_ALE, and the write enable signal H_WEn to a non-active state. According to this, each bridge chip BC transitions the command latch enable signal N_CLE, the address latch enable signal N_ALE, and the write enable signal N_WEn to a non-active state. These signals are supplied to the target memory chip CP via the local channel CH.

At a timing t32, the host HA transitions the command latch enable signal H_CLE to an active state (H level) and transmits the command latch enable signal H_CLE to each bridge chip BC via the host channel HCHi. According to this, each bridge chip BC transitions the command latch enable signal N_CLE to an active state (H level). This signal is supplied to the target memory chip CP via the local channel CH. With this, the host HA transmits the bridge control start command CM21 as the data signal H_DQ to each of the bridge chips BC1 to BC4, and toggles the write enable signal H_WEn.

At a timing t33, each bridge chip BC samples the bridge control start command CM21 in synchronization with a rising edge of the write enable signal H_WEn according to an active state of the command latch enable signal H_CLE and interprets the bridge control start command CM21 as an instruction for the start of the bridge control period. Each bridge chip BC transitions the internal bridge chip enable signal IBRG_CEn in the register 114 to an active state (L level) according to the interpretation result.

After that, the host HA transitions the command latch enable signal H_CLE to a non-active state (L level).

At a timing t34, the host HA transitions the address latch enable signal H_ALE to an active state (H level) and transmits the address latch enable signal H_ALE to each bridge chip BC via the host channel HCHi. Further, each bridge chip BC transitions the chip enable signal N_CEn to a non-active state (H level) according to an active state of the internal bridge chip enable signal IBRG_CEn and supplies the chip enable signal N_CEn to the target memory chip CP via the local channel CH. Further, each bridge chip BC resumes the gating of the command latch enable signal H_CLE, the address latch enable signal H_ALE, the write enable signal H_WEn, and the data signal H_DQ.

At a timing t35, each of the bridge chips BC1 to BC4 samples the address information ADD1 on the signal line of the data signal H_DQ in synchronization with a rising edge of the write enable signal H_WEn according to an active state of the address latch enable signal H_ALE, interprets the address information ADD1, and determines whether the own bridge chip BC is designated.

For example, when the bridge chip BC1 is designated by the address information ADD1, the bridge chip BC1 determines that the own bridge chip BC is designated, and the bridge chips BC2 to BC4 determine that the own bridge chip BC is not designated.

After that, the host HA transitions the address latch enable signal H_ALE to a non-active state (L level).

After a timing t36, each of the non-selected bridge chips BC2 to BC4 continues the gating of the chip enable signal H_CEn, the command latch enable signal H_CLE, the address latch enable signal H_ALE, the write enable signal H_WEn, and the data signal H_DQ. The local channels CH3 to CH8 corresponding to the non-selected bridge chips BC2 to BC4 continue to be in the state where each signal does not appear. The non-selected bridge chips BC2 to BC4 maintain the internal bridge chip enable signal IBRG_CEn in the register 114 in an active state (L level).

On the other hand, the selected bridge chip BC1 operates as follows.

At the timing t36, the host HA transitions the command latch enable signal H_CLE to an active state (H level) and transmits the command latch enable signal H_CLE to each bridge chip BC via the host channel HCHi.

At a timing t37, the selected bridge chip BC1 samples the bridge control end command CM22 in synchronization with the rising edge of the write enable signal H_WEn according to an active state of the command latch enable signal H_CLE and interprets the bridge control end command CM22 as an instruction for the end of the bridge control period. The selected bridge chip BC1 transitions the internal bridge chip enable signal IBRG_CEn in the register 114 to a non-active state (H level) according to the interpretation result.

After that, at the timings t6 to t16, the same operations as those in the above embodiment are performed.

After that, although not illustrated, when the host HA transitions the chip enable signal H_CEn to a non-active state (H level), the selected bridge chip BC1 transitions the chip enable signal N_CEn to a non-active state (H level) and resumes the gating of the command latch enable signal H_CLE, the address latch enable signal H_ALE, the write enable signal H_WEn, and the data signal H_DQ. The non-selected bridge chips BC2 to BC4 transition the internal bridge chip enable signal IBRG_CEn in the register 114 to a non-active state (H level).

Also with such an operation, the host HA can access the target memory chip CP via the bridge chip BC designated by the address information among the plurality of bridge chips BC1 to BC4. As a result, as compared with the case where all the memory chips CP are accessed via all the bridge chips BC, the access concentration on one bridge chip can be reduced, and the target memory chip CP can be efficiently accessed.

Figure 6:
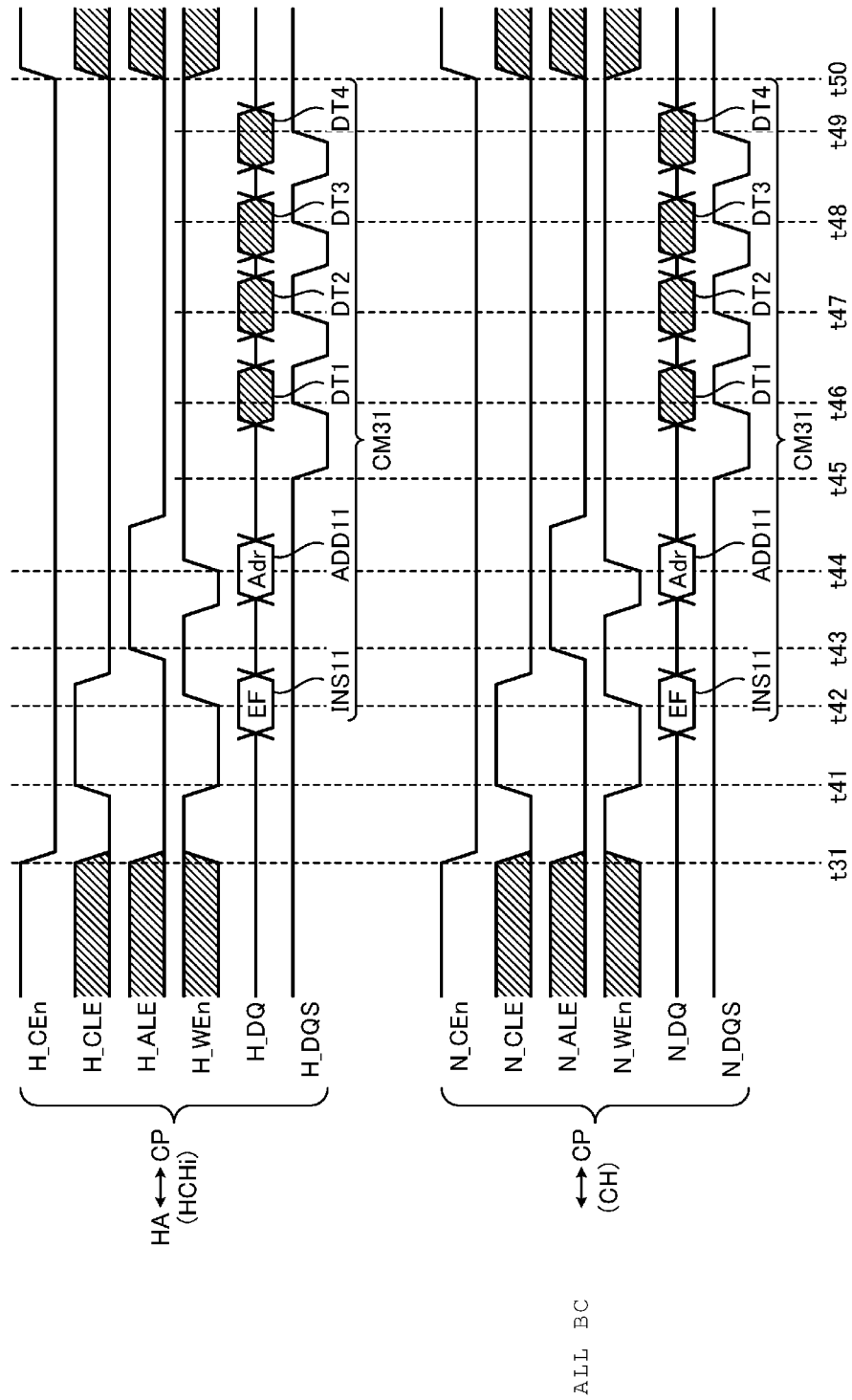
FIG. 6 is a waveform diagram illustrating operations of a semiconductor device according to a second modified example 2 of the embodiment.

Further, as a second modified example of the above embodiment, as illustrated in FIG. 6, a broadcast operation by which registers 202a of all the memory chips CP are accessed via all the bridge chips BC1 to BC4 may be performed. FIG. 6 is a waveform diagram illustrating operations of a semiconductor device 1i according to the second modified example of the above embodiment. The configuration of the semiconductor device 1i according to the second modified example is the same as the configuration of the semiconductor device 1i according to the first modified example illustrated in FIG. 4. As illustrated in FIG. 4, the peripheral circuit 202 of each memory chip CP has the register 202a for storing the operation control information.

As the broadcast operation, while setting all the bridge chips BC1 to BC4 to a command standby state, the host HA transmits the specific command to all the bridge chips BC1 to BC4 without starting the bridge control period. The specific command is a command other than the bridge control start command CM21 and the bridge control end command CM22. At this time, since all the bridge chips BC1 to BC4 are still in the command standby state, and the operation for selecting the bridge chip BC is not performed, all the bridge chips BC1 to BC4 are equivalently in all the selected states. For this reason, the host HA can broadcast the specific command to all the memory chips CP1 to CP8 via all the bridge chips BC1 to BC4.

The specific command may be a Set Feature command CM31. The host HA can access the register 202a and write the operation control information with the Set Feature command CM31. Alternatively, the specific command may be a Get Feature command. The host HA can access the register 202a and read the operation control information using the Get Feature command. Alternatively, the specific command may be a Read Status command. The host HA can access the register 202a and read the status information using the Read Status command. In the following, the case where the specific command is the Set Feature command CM31 will be illustrated. The Set Feature command CM31, the Get Feature command, and the Read Status command are commands conforming to a predetermined standard of the host channel HCHi.

The Set Feature command CM31 includes instruction information INS11, address information ADD11, and operation control information DT1 to DT4. The instruction information INS11 indicates a write instruction to the register 202a. The address information ADD11 indicates a place in the register 202a where the operation control information is to be stored. The operation control information DT1 to DT4 is information to be stored in the register 202a.

For example, the peripheral circuit 202 of each memory chip CP has the register 202a for storing the operation control information, as illustrated in FIG. 4. The host HA can select all the bridge chips BC1 to BC4 and write the operation control information to the registers 202a of the memory chips CP1 to CP8 with the Set Feature command CM31.

It is noted that the host channel HCHi may include a signal line of a data strobe signal H_DQS. The terminal group 10i may include a terminal of the data strobe signal H_DQS. The data strobe signal H_DQS can be used to control the timing of taking in the operation control information to be stored in the register 202a as the DQ.

After, at the timing t31 illustrated in FIG. 6, the same operations as those of the first modified example are performed, and at a timing t41, the host HA transitions the command latch enable signal H_CLE to an active state (H level) and transmits the command latch enable signal H_CLE to each bridge chip BC1 to BC4 via the channel HCHi. With this, the host HA transitions the write enable signal H_WEn to a non-active state and transmits the write enable signal H_WEn to the bridge chips BC1 to BC4 via the host channel HCHi. According to this, each of the bridge chips BC1 to BC4 is in the command standby state. Further, each of the bridge chips BC1 to BC4 transitions the command latch enable signal N_CLE to an active state (H level) and transitions the write enable signal N_WEn to a non-active state with respect to the memory chip CP connected to each of the bridge chips BC1 to BC4. After that, the host HA transmits the instruction information INS11 as the data signal H_DQ to each of the bridge chips BC1 to BC4 and toggles the write enable signal H_WEn.

At a timing t42, each of the bridge chips BC1 to BC4 samples the instruction information INS11 in synchronization with a rising edge of the write enable signal H_WEn according to an active state of the command latch enable signal H_CLE, and interprets the instruction information INS11 as the write instruction to the register 202a. Each of the bridge chips BC1 to BC4 supplies the instruction information INS11 according to the interpretation result to the connected memory chip CP as the data signal N_DQ via the local channel CH. After that, the host HA transitions the command latch enable signal H_CLE to a non-active state (L level).

At a timing t43, the host HA transitions the address latch enable signal H_ALE to an active state (H level) and transmits the address latch enable signal H_ALE to each of the bridge chips BC1 to BC4 via the host channel HCHi. At this time, each of the bridge chips BC1 to BC4 maintains the chip enable signal N_CEn to an active state and disables the gating of the command latch enable signal H_CLE, the address latch enable signal H_ALE, the write enable signal H_WEn, and the data signal H_DQ.

At a timing t44, each of the bridge chips BC1 to BC4 samples the address information ADD11 on the signal line of the data signal H_DQ in synchronization with a rising edge of the write enable signal H_WEn according to an active state of the address latch enable signal H_ALE, and interprets the address information ADD11. Each of the bridge chips BC1 to BC4 supplies an interpretation result of the address information ADD11 as the data signal N_DQ to the connected memory chip CP via the local channel CH. After that, the host HA transitions the address latch enable signal H_ALE to a non-active state (L level).

At a timing t45, the host HA toggles a data strobe signal DQS.

At timings t46 to t49, the host HA transmits the operation control information DT1 to DT4 as the data signals H_DQ to the bridge chips BC1 to BC4. The bridge chips BC1 to BC4 sample the operation control information DT1 to DT4 on the signal line of the data signal H_DQ in synchronization with rising edges of the data strobe signal H_DQS according to the instruction information INS11. Each of the bridge chips BC1 to BC4 transmits the sampled operation control information DT1 to DT4 as the data signal N_DQ to the connected memory chip CP in synchronization with the rising edges of a data strobe signal N_DQS. Each memory chip CP writes the operation control information DT1 to DT4 to the location designated with the address information ADD11 in the register 202a.

At a timing t50, when the host HA transitions the chip enable signal H_CEn to a non-active state (H level), each of the bridge chips BC1 to BC4 transitions the chip enable signal N_CEn to a non-active state (H level), and resumes the gating of the command latch enable signal H_CLE, the address latch enable signal H_ALE, the write enable signal H_WEn, and the data signal H_DQ.

In this manner, by inputting the specific command while setting to the command standby state, the plurality of bridge chips BC1 to BC4 can broadcast the specific command to the plurality of memory chips CP1 to CP8. The specific command may be the Set Feature command CM31. Accordingly, the host HA can collectively access the registers 202a of all the memory chips CP, and for example, can collectively set the operation control information of all the memory chips CP.

Figure 7:
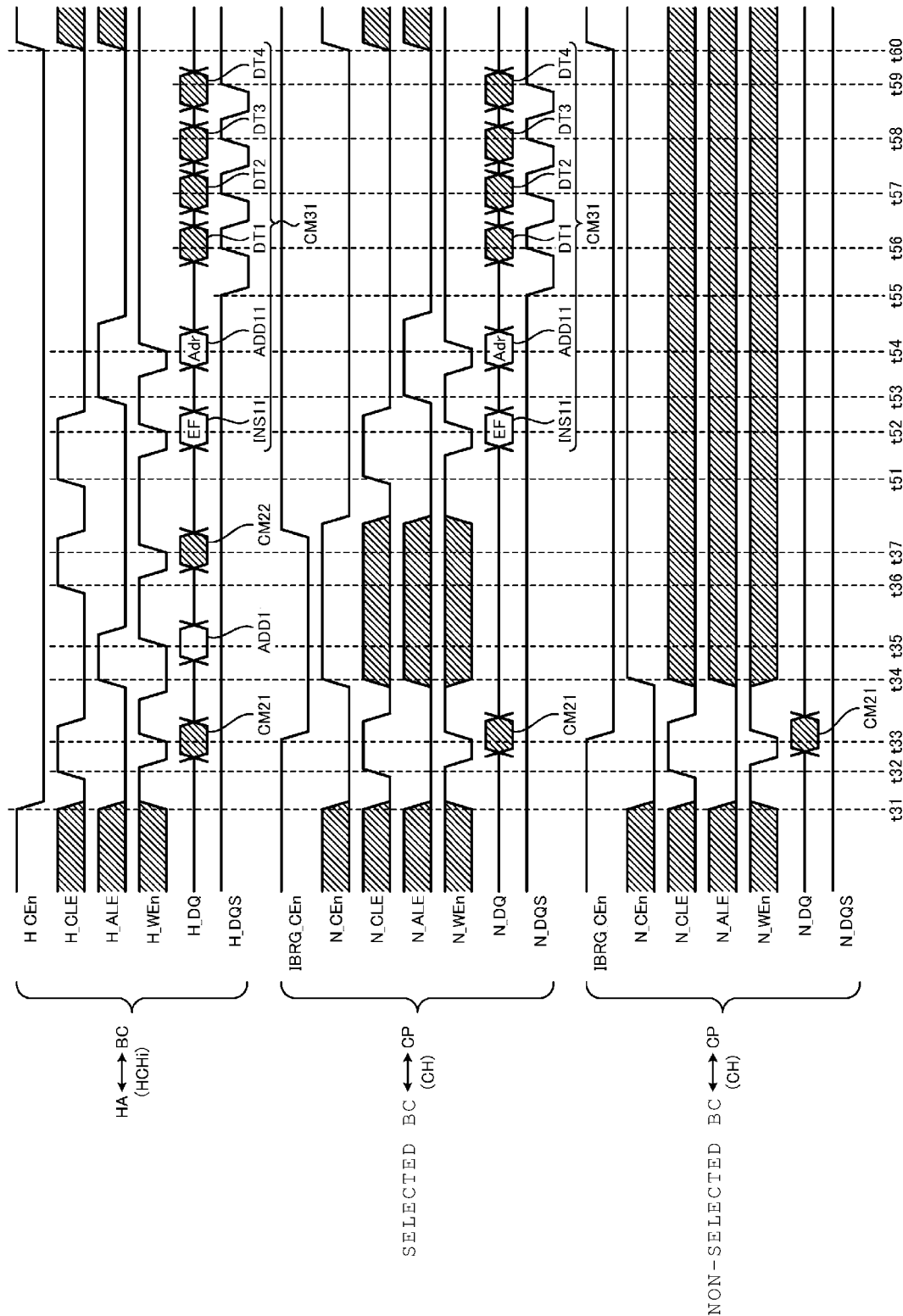
FIG. 7 is a waveform diagram illustrating operations of a semiconductor device according to a third modified example of the embodiment.

Further, as a third modified example of the above embodiment, as illustrated in FIG. 7, an operation of accessing the register 202a of the target memory chip CP via the selected bridge chip BC may be performed. FIG. 7 is a waveform diagram illustrating operations of the semiconductor device 1i according to the third modified example of the above embodiment. The configuration of the semiconductor device 1i according to the third modified example is the same as the configurations of the semiconductor devices 1i according to the first modified example and the second modified example illustrated in FIG. 4.

For example, as in the first modified example, by setting the state in which the target bridge chip BC is selected with the bridge control start command CM21, an address information ADD1, and the bridge control end command CM22, the host HA can transmit the specific command to the target memory chip CP via the target bridge chip BC.

The specific command may be the Set Feature command CM31, may be the Get Feature command, or may be the Read Status command. In the following, the case where the specific command is the Set Feature command CM31 will be illustrated.

The host HA can designate the target bridge chip BC by the address information ADD1, and write the operation control information to the register 202a of the target memory chip CP with the Set Feature command CM31.

At each of the timings t31 to t37 illustrated in FIG. 7, the same operations as those of the first modified example are performed, and for example, the bridge chip BC1 is designated. The non-selected bridge chips BC2 to BC4 continue the gating of the chip enable signal H_CEn, the command latch enable signal H_CLE, the address latch enable signal H_ALE, the write enable signal H_WEn, and the data signal H_DQ, respectively. The non-selected bridge chips BC2 to BC4 maintain the internal bridge chip enable signal IBRG_CEn in the register 114 in an active state (L level).

On the other hand, the selected bridge chip BC1 operates as follows.

At a timing t51, the host HA transitions the command latch enable signal H_CLE to an active state (H level) and transmits the command latch enable signal H_CLE to each bridge chip BC via the host channel HCHi.

At a timing t52, the selected bridge chip BC1 samples the instruction information INS11 in synchronization with a rising edge of the write enable signal H_WEn according to an active state of the command latch enable signal H_CLE, and interprets the instruction information INS11 as the write instruction to the register 202a. The selected bridge chip BC1 supplies the instruction information INS11 according to the interpretation result to the target memory chip CP as the data signal N_DQ via the local channel CH. After that, the host HA transitions the command latch enable signal H_CLE to a non-active state (L level).

At a timing t53, the host HA transitions the address latch enable signal H_ALE to an active state (H level) and transmits the address latch enable signal H_ALE to each bridge chip BC via the host channel HCHi.

At a timing t54, the selected bridge chip BC1 samples the address information ADD11 in synchronization with a rising edge of the write enable signal H_WEn according to an active state of the address latch enable signal H_ALE, and interprets the address information ADD11. The selected bridge chip BC1 supplies an interpretation result of the address information ADD11 to the target memory chip CP as the data signal N_DQ via the local channel CH.

At a timing t55, the host HA toggles the data strobe signal H_DQS.

At timings t56 to t59, the host HA transmits operation control information DT1 to DT4 as the data signals H_DQ to the bridge chips BC1 to BC4. The selected bridge chip BC1 samples the operation control information DT1 to DT4 on the signal line of the data signal H_DQ in synchronization with rising edges of the data strobe signal H_DQS according to the instruction information INS11. The selected bridge chip BC1 transmits the sampled operation control information DT1 to DT4 as the data signal N_DQ to the target memory chip CP in synchronization with the rising edges of the data strobe signal N_DQS. The target memory chip CP writes the operation control information DT1 to DT4 to the location designated by the address information ADD11 in the register 202a.

At a timing t60, when the host HA transitions the chip enable signal H_CEn to a non-active state (H level), each of the bridge chips BC1 to BC4 transitions the chip enable signal N_CEn to a non-active state (H level), and resumes the gating of the command latch enable signal H_CLE, the address latch enable signal H_ALE, the write enable signal H_WEn, and the data signal H_DQ.

In this manner, the host HA can access the register 202a of the target memory chip CP via the bridge chip BC designated by the address information among the plurality of bridge chips BC1 to BC4. As a result, as compared with the case where the registers 202a of all the memory chips CP are accessed via all the bridge chips BC, the access concentration on one bridge chip can be reduced. Further, as compared with the case where the terminal of the bridge chip enable signal BRG_CEn is provided for each bridge chip BC, the number of terminals can be reduced. As a result, the register of the target memory chip CP can be efficiently accessed, and thus, for example, the operation control information can be efficiently set in the register 202a of the target memory chip CP.

Figure 8:
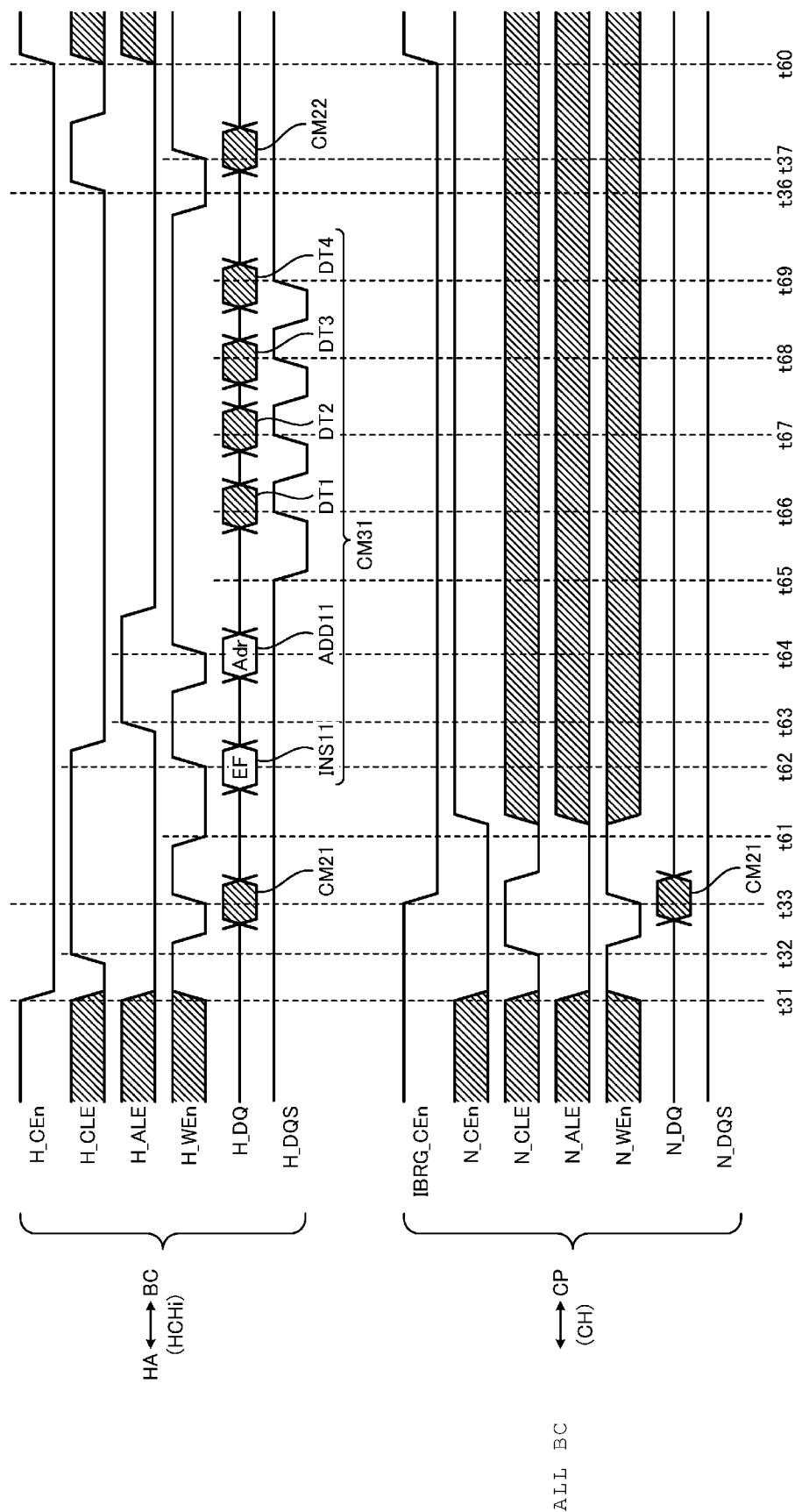
FIG. 8 is a waveform diagram illustrating operations of a semiconductor device according to a fourth modified example of the embodiment.

Further, as a fourth modified example of the above embodiment, as illustrated in FIG. 8, the broadcast operation in which the registers of all bridge chips BC are accessed may be performed. FIG. 8 is a waveform diagram illustrating operations of the semiconductor device 1i according to the fourth modified example. The configuration of the semiconductor device 1i according to the fourth modified example is the same as the configuration of the semiconductor device 1i according to the first modified example 1 to the third modified example illustrated in FIG. 4.

As the broadcast operation, by setting all the bridge chips BC1 to BC4 to the command standby state, the host HA transmits the specific command to all the bridge chips BC1 to BC4 with starting of the bridge control period but without designation of the bridge chip BC. At this time, since all the bridge chips BC1 to BC4 are still in the command standby state, and the operation for selecting the bridge chip BC is not performed, all the bridge chips BC1 to BC4 are in an equivalently selected state. Therefore, the host HA can broadcast the specific command to all the bridge chips BC1 to BC4.

The specific command may be the Set Feature command CM31, the Get Feature command, or the Read Status command. In the following, the case where the specific command is the Set Feature command CM31 will be illustrated.

The host HA can write the operation control information to the registers 114 of the bridge chips BC1 to BC4 with the Set Feature command CM31.

At each of the timing t31 to t33 illustrated in FIG. 8, the same operations as those of the first modified example are performed. Each bridge chip BC transitions the internal bridge chip enable signal IBRG_CEn in the register 114 to an active state (L level).

At a timing t61, each bridge chip BC transitions the chip enable signal N_CEn to a non-active state (H level) according to an active state of the internal bridge chip enable signal IBRG_CEn and supplies to the connected memory chip CP via the local channel CH. Further, each bridge chip BC resumes the gating of the command latch enable signal H_CLE, the address latch enable signal H_ALE, the write enable signal H_WEn, and the data signal H_DQ.

At a timing t62, each of the bridge chips BC1 to BC4 samples the instruction information INS11 in synchronization with a rising edge of the write enable signal H_WEn according to an active state of the command latch enable signal H_CLE, and interprets the instruction information INS11 as the write instruction to the register 202a. The bridge chips BC1 to BC4 do not supply an interpretation result of the instruction information INS11 to the connected memory chip CP. After that, the host HA transitions the command latch enable signal H_CLE to a non-active state (L level).

At a timing t63, the host HA transitions the address latch enable signal H_ALE to an active state (H level) and transmits the address latch enable signal H_ALE to each of the bridge chips BC1 to BC4 via the host channel HCHi. At this time, each of the bridge chips BC1 to BC4 maintains the internal bridge chip enable signal IBRG_CEn in an active state. Therefore, each of the bridge chips BC1 to BC4 maintains the chip enable signal N_CEn in a non-active state, and continues the gating of the command latch enable signal H_CLE, the address latch enable signal H_ALE, the write enable signal H_WEn, and the data signal H_DQ.

At a timing t64, each of the bridge chips BC1 to BC4 samples the address information ADD11 on the signal line of the data signal H_DQ in synchronization with a rising edge of the write enable signal H_WEn according to an active state of the address latch enable signal H_ALE, and interprets the address information ADD11. The bridge chips BC1 to BC4 do not supply an interpretation result of the address information ADD11 to the connected memory chip CP.

After that, the host HA transitions the address latch enable signal H_ALE to a non-active state.

At a timing t65, the host HA toggles the data strobe signal DQS.

At timings t66 to t69, the host HA transmits the operation control information DT1 to DT4 as the data signal H_DQ to each of bridge chips BC1 to BC4. The bridge chips BC1 to BC4 sample the operation control information DT1 to DT4 on the signal line of the data signal H_DQ in synchronization with rising edges of the data strobe signal H_DQS according to the instruction information INS11. Each of the bridge chips BC1 to BC4 writes the sampled operation control information DT1 to DT4 to the location in the register 114 designated by the address information ADD11.

At the timing t36, the host HA transitions the command latch enable signal H_CLE to an active state (H level) and transmits the command latch enable signal H_CLE to each bridge chip BC via the host channel HCHi.

At the timing t37, each of the bridge chips BC1 to BC4 samples the bridge control end command CM22 in synchronization with a rising edge of the write enable signal H_WEn according to an active state of the command latch enable signal H_CLE, and interprets the bridge control end command CM22 as an instruction for the end of the bridge control period.

At the timing t60, the host HA transitions the chip enable signal H_CEn to a non-active state. Further, each of the bridge chips BC1 to BC4 transitions the internal bridge chip enable signal IBRG_CEn in the register 114 to a non-active state (H level) according to the interpretation result of the bridge control end command CM22.

In this manner, in the plurality of bridge chips BC1 to BC4, in the state in which designation is not performed while the bridge control period is started, the specific command is input, so that equivalently, the specific command can be broadcast to the plurality of bridge chips BC1 to BC4. The specific command may be the Set Feature command CM31. Accordingly, the host HA can collectively access the registers 114 of all the bridge chips BC1 to BC4, and for example, the operation control information can be collectively set to all the bridge chips BC1 to BC4.

Figure 9:
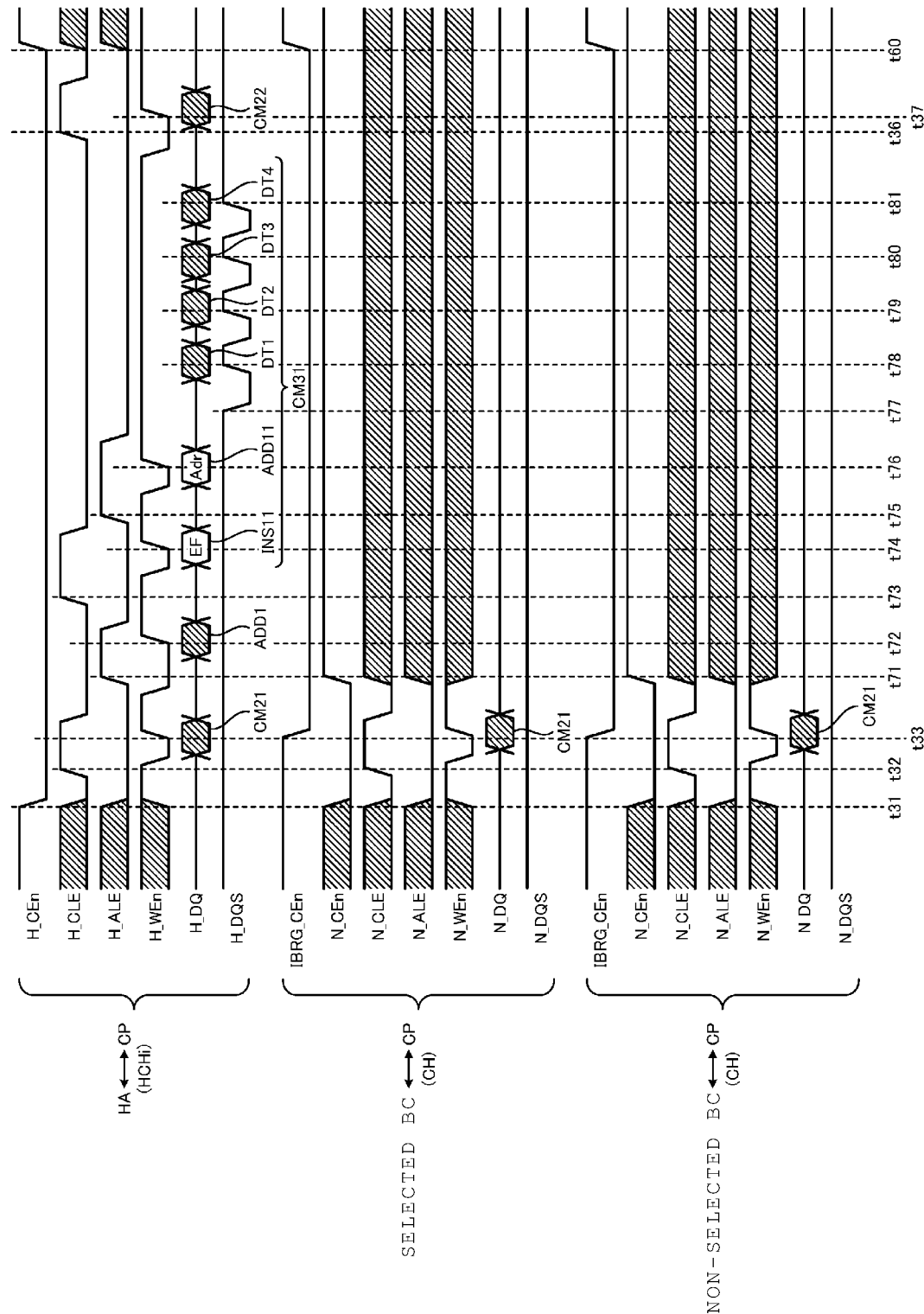
FIG. 9 is a waveform diagram illustrating operations of a semiconductor device according to a fifth modified example of the embodiment.

Further, as a fifth modified example of the above embodiment, as illustrated in FIG. 9, an operation of accessing the register 114 of the selected bridge chip BC may be performed. FIG. 9 is a waveform diagram illustrating operations of the semiconductor device 1i according to the fifth modified example. The configuration of the semiconductor device 1i according to the fifth modified example is the same as the configuration of the semiconductor device 1i according to the first modified example to the fourth modified example illustrated in FIG. 4.

For example, as in the first modified example, by setting the state in which the target bridge chip BC is designated by the bridge control start command CM21 and the address information ADD1, the host HA can transmit the specific command to the target bridge chip BC.

The specific command may be the Set Feature command CM31, may be the Get Feature command, or may be the Read Statue command. In the following, the case where the specific command is the Set Feature command CM31 will be illustrated.

The host HA can designate the target bridge chip BC by the address information ADD1 and can write the operation control information to the register 114 of the target bridge chip BC with the Set Feature command CM31.

At the timings t31 to t33 illustrated in FIG. 9, the same operations as those of the first modified example are performed, and each bridge chip BC transitions the internal bridge chip enable signal IBRG_CEn in the register 114 to an active state (L level).

At a timing t71, the host HA transitions the address latch enable signal H_ALE to an active state (H level) and transmits the address latch enable signal H_ALE to each bridge chip BC via the host channel HCHi. Further, each bridge chip BC transitions the chip enable signal N_CEn to a non-active state (H level) according to an active state of the internal bridge chip enable signal IBRG_CEn, and supplies the chip enable signal N_CEn to the connected memory chip CP via the local channel CH. Each bridge chip BC resumes the gating of the command latch enable signal H_CLE, the address latch enable signal H_ALE, the write enable signal H_WEn, and the data signal H_DQ.

At a timing t72, each of the bridge chips BC1 to BC4 samples the address information ADD1 on the signal line of the data signal H_DQ in synchronization with a rising edge of the write enable signal H_WEn according to an active state of the address latch enable signal H_ALE, interprets the address information ADD1, and determines whether the own bridge chip BC is designated.

For example, when the bridge chip BC1 is designated by the address information ADD1, the bridge chip BC1 determines that the own bridge chip BC is designated, and the bridge chips BC2 to BC4 determine that the own bridge chip BC is not designated.

After that, the host HA transitions the address latch enable signal H_ALE to a non-active state (L level).

After a timing t73, each of the non-selected bridge chips BC2 to BC4 wait until the bridge control end command CM22 appears on the signal line of the data signal H_DQ according to the fact that the address is not designated in the address information ADD1. That is, the non-selected bridge chips BC2 to BC4 ignore information other than the bridge control end command CM22 on the signal line of the data signal H_DQ.

Each of the non-selected bridge chips BC2 to BC4 maintains the chip enable signal N_CEn in a non-active state and continues the gating of the command latch enable signal H_CLE, the address latch enable signal H_ALE, the write enable signal H_WEn, and the data signal H_DQ. The local channels CH3 to CH8 corresponding to the non-selected bridge chips BC2 to BC4 continue to be in the state where each signal does not appear. The non-selected bridge chips BC2 to BC4 maintain the internal bridge chip enable signal IBRG_CEn in the register 114 in an active state (L level).

On the other hand, the selected bridge chip BC1 operates as follows.

At the timing t73, the host HA transitions the command latch enable signal H_CLE to an active state (H level) and transmits the command latch enable signal H_CLE to each bridge chip BC via the host channel HCHi.

At the timing t74, the selected bridge chip BC1 samples the instruction information INS11 in the Set Feature command CM31 in synchronization with a rising edge of the write enable signal H_WEn according to an active state of the command latch enable signal H_CLE, and interprets the information INS11 as the write instruction to the register 114. The selected bridge chip BC1 does not supply an interpretation result of the instruction information INS11 to the connected memory chip CP. After that, the host HA transitions the command latch enable signal H_CLE to a non-active state (L level).

At a timing t75, the host HA transitions the address latch enable signal H_ALE to an active state (H level) and transmits the address latch enable signal H_ALE to the bridge chips BC1 to BC4 via the host channel HCHi. At this time, the selected bridge chip BC1 maintains the internal bridge chip enable signal IBRG_CEn in an active state. Therefore, the selected bridge chip BC1 maintains the chip enable signal N_CEn in a non-active state, and the selected bridge chip BC1 continues the gating of the command latch enable signal H_CLE, the address latch enable signal H_ALE, the write enable signal H_WEn, and the data signal H_DQ.

At a timing t76, the selected bridge chip BC1 samples the address information ADD11 on the signal line of the data signal H_DQ in synchronization with a rising edge of the write enable signal H_WEn according to an active state of the address latch enable signal H_ALE, and interprets the address information ADD11. The selected bridge chip BC1 does not supply an interpretation result of the address information ADD11 to the connected memory chip CP.

After that, the host HA transitions the address latch enable signal H_ALE to a non-active state.

At a timing t77, the host HA toggles the data strobe signal H_DQS.

At timings t78 to t81, the host HA transmits the operation control information DT1 to DT4 as the data signals H_DQ to each of the bridge chips BC1 to BC4. The selected bridge chip BC1 samples the operation control information DT1 to DT4 on the signal line of the data signal H_DQ in synchronization with rising edges of the data strobe signal H_DQS according to the instruction information INS11. The selected bridge chip BC1 writes the sampled operation control information DT1 to DT4 to the location in the register 114 designated by the address information ADD11.

At the timing t36, the host HA transitions the command latch enable signal H_CLE to an active state (H level) and transmits the command latch enable signal H_CLE to each bridge chip BC via the host channel HCHi.

At the timing t37, the bridge chips BC1 to BC4 sample the bridge control end command CM22 in synchronization with a rising edge of the write enable signal H_WEn according to an active state of the command latch enable signal H_CLE, and interpret the bridge control end command CM22 as an instruction for the end of the bridge control period.

At the timing t60, the host HA transitions the chip enable signal H_CEn to a non-active state. Further, each of the bridge chips BC1 to BC4 transitions the internal bridge chip enable signal IBRG_CEn in the register 114 to a non-active state (H level) according to the interpretation result of the bridge control end command CM22.

In this manner, the host HA can access the register 114 of the bridge chip BC designated by the address information ADD1 among the plurality of bridge chips BC1 to BC4. Accordingly, for example, the operation control information can be set in the target bridge chip BC.

Further, as a sixth modified example of the above embodiment, the command for accessing the memory chip CP may include address information ADD41 for designating the bridge chip BC, and the order in the command may be changed.

Figure 10:
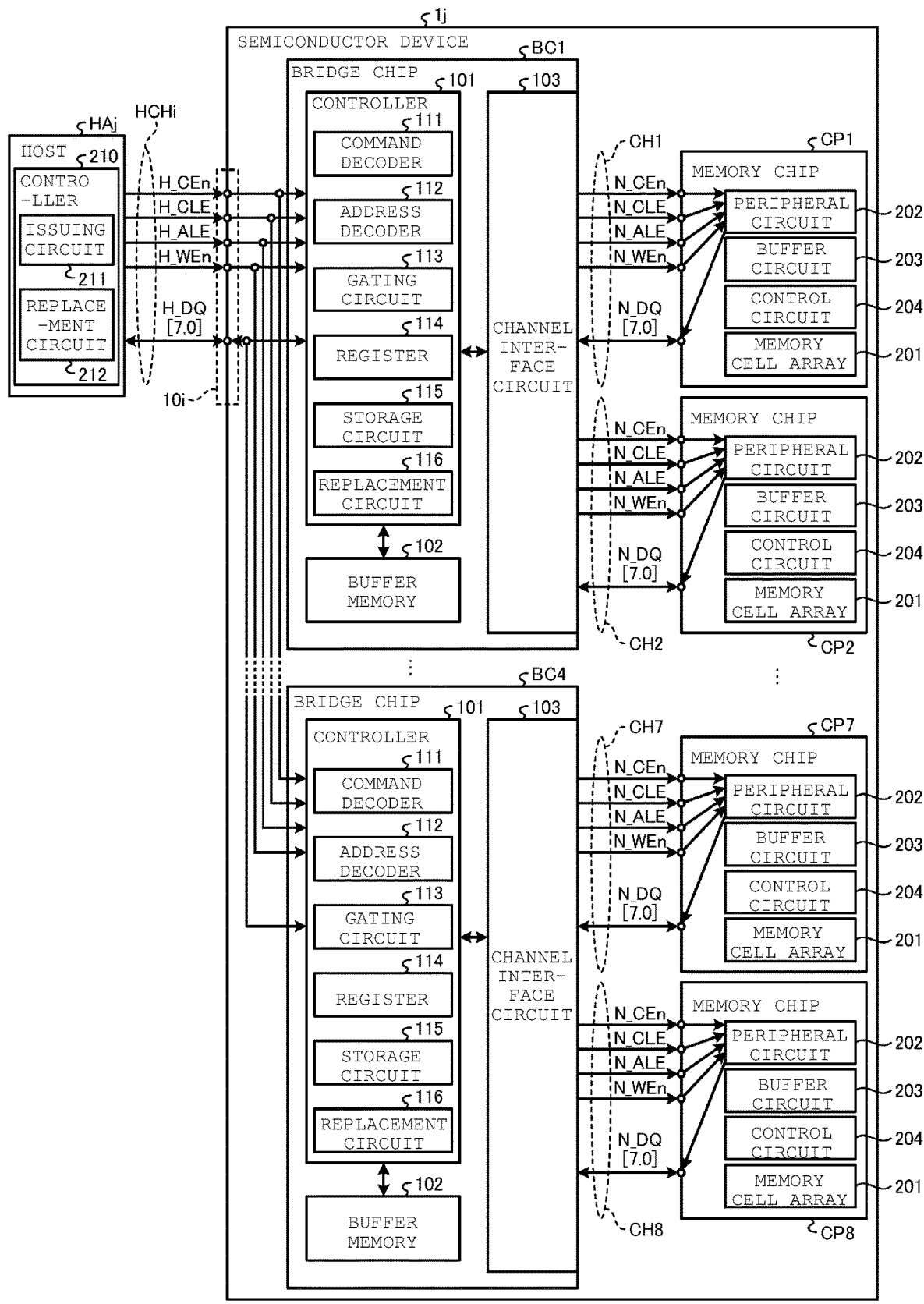
FIG. 10 is a diagram illustrating a configuration of a host and a semiconductor device according to a sixth modified example of the embodiment.

For example, a host HAj and a semiconductor device 1j can be configured as illustrated in FIG. 10. FIG. 10 is a block diagram illustrating a configuration of the host HAj and the semiconductor device 1j according to the sixth modified example.

Figure 11A:
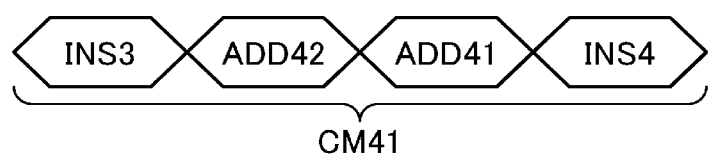
FIGS. 11A and 11B are diagrams illustrating arrangement orders of information in a command in the sixth modified example of the embodiment.
Figure 11B:
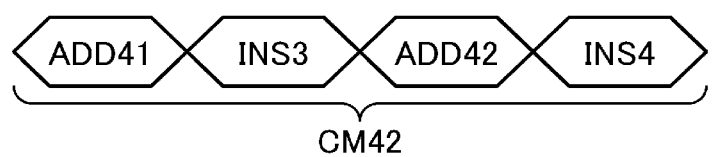

The host HAj has a controller 210. The controller 210 has an issuing circuit 211 and a replacement circuit 212. The issuing circuit 211 issues a command for accessing the memory chip CP according to a predetermined standard of the host channel HCHi. As illustrated in FIG. 11A, the issuing circuit 211 may issue a command CM41 of which address field is expanded and format is changed so as to include the address information ADD41 that designates the bridge chip BC. FIGS. 11A and 11B are diagrams illustrating arrangement orders of information in the command in the sixth modified example.

The command CM41 includes instruction information INS3, address information ADD42, address information ADD41, and instruction information INS4 in this order. The command CM41 is issued in the order of the instruction information INS3, the address information ADD42, the address information ADD41, and the instruction information INS4. The instruction information INS3 may be a write instruction instructing to write data into the memory cell array 201 or may be a read instruction instructing to read data from the memory cell array 201. The instruction information INS4 may be an instruction for data output.

The address information ADD42 and the address information ADD41 may be, for example, the information illustrated in FIG. 12. FIG. 12 is a diagram illustrating address information ADD42 and ADD41 included in the command in the sixth modified example. The signal line of the data signal H_DQ[7:0] is, for example, an 8-bit width bus wiring line. The data signal H_DQ[7:0] can be transmitted in units of 8 bits=1 word at the same timing.

The address information ADD42 includes a plurality of address words Adr1 to Adr4. Each of the address words Adr1 to Adr4 includes an address (in-chip address) in the memory cell array 201 of the memory chip CP. The memory cell array 201 is configured so that a plurality of memory cell transistors include a plurality of rows and a plurality of columns corresponding to a plurality of word lines and a plurality of bit lines. The address words Adr1 and Adr2 may include column addresses as in-chip addresses. The address words Adr3 and Adr4 may include row addresses as in-chip addresses.

The address information ADD41 designates a bridge chip BC. The address information ADD41 includes a plurality of address words Adr5 and Adr6. The address word Adr5 includes a chip identifier and the in-chip address (for example, a row address). The address word Adr6 includes a bridge identifier and the chip identifier. The chip identifier is information for identifying a memory chip CP and may be a memory chip number. The bridge identifier is information for identifying a bridge chip BC and may be a bridge chip number. FIG. 11A illustrates a data structure in which the bridge identifier is assigned to the second to fourth bits in the address word Adr6, and the chip identifier is assigned to the sixth to seventh bits in the address word Adr5 and the zeroth to first bits in the address word Adr6. The assignment method is not limited to this example, but these identifiers may be freely assigned.

Herein, it is difficult to change the order of information in the command due to standard restrictions in each local channel CH illustrated in FIG. 10. However, the standard restrictions are loose in the host channel HCHi. The standard of the host channel HCHi may be shared by the controller 210 provided in the host HAj and the controller 101 provided in the bridge chip BC.

Therefore, the replacement circuit 212 replaces the order of the information in the command CM41 illustrated in FIG. 11A. The replacement circuit 212 changes the address information ADD41 in the command CM41 before the instruction information INS3 to generate a command CM42 illustrated in FIG. 11B. The controller 210 transmits the generated command CM42 to the bridge chips BC1 to BC4 via the host channel HCHi. The command CM42 is issued in the order of the address information ADD41, the instruction information INS3, the address information ADD42, and the instruction information INS4.

Accordingly, the controllers 101 of the bridge chips BC1 to BC4 can determine whether the own bridge chip BC is designated when the address information ADD41 in the command CM 42 is received. Accordingly, the time until the selected bridge chip BC starts transferring the instruction information INS3 or the like to the memory chip CP via the local channel CH can be shortened.

At this time, the controller 101 of each of the bridge chips BC1 to BC4 illustrated in FIG. 10 has a replacement circuit 116. The replacement circuit 116 switches the order of the information in the command CM42 illustrated in FIG. 11B to the order of the command CM41 illustrated in FIG. 11A. The replacement circuit 116 switches the address information ADD41 in the command CM42 to the position between the address information ADD42 and the instruction information 4 to generate the command CM41 illustrated in FIG. 11A.

Accordingly, the selected bridge chip BC can transfer the command CM41 including, in the order, the instruction information INS3, the address information ADD42, the address information ADD41, and the instruction information 42 to the memory chip CP via the local channel CH. Therefore, while observing the restrictions on the standard, the transfer of the command CM41 can be performed rapidly.

Figure 13:
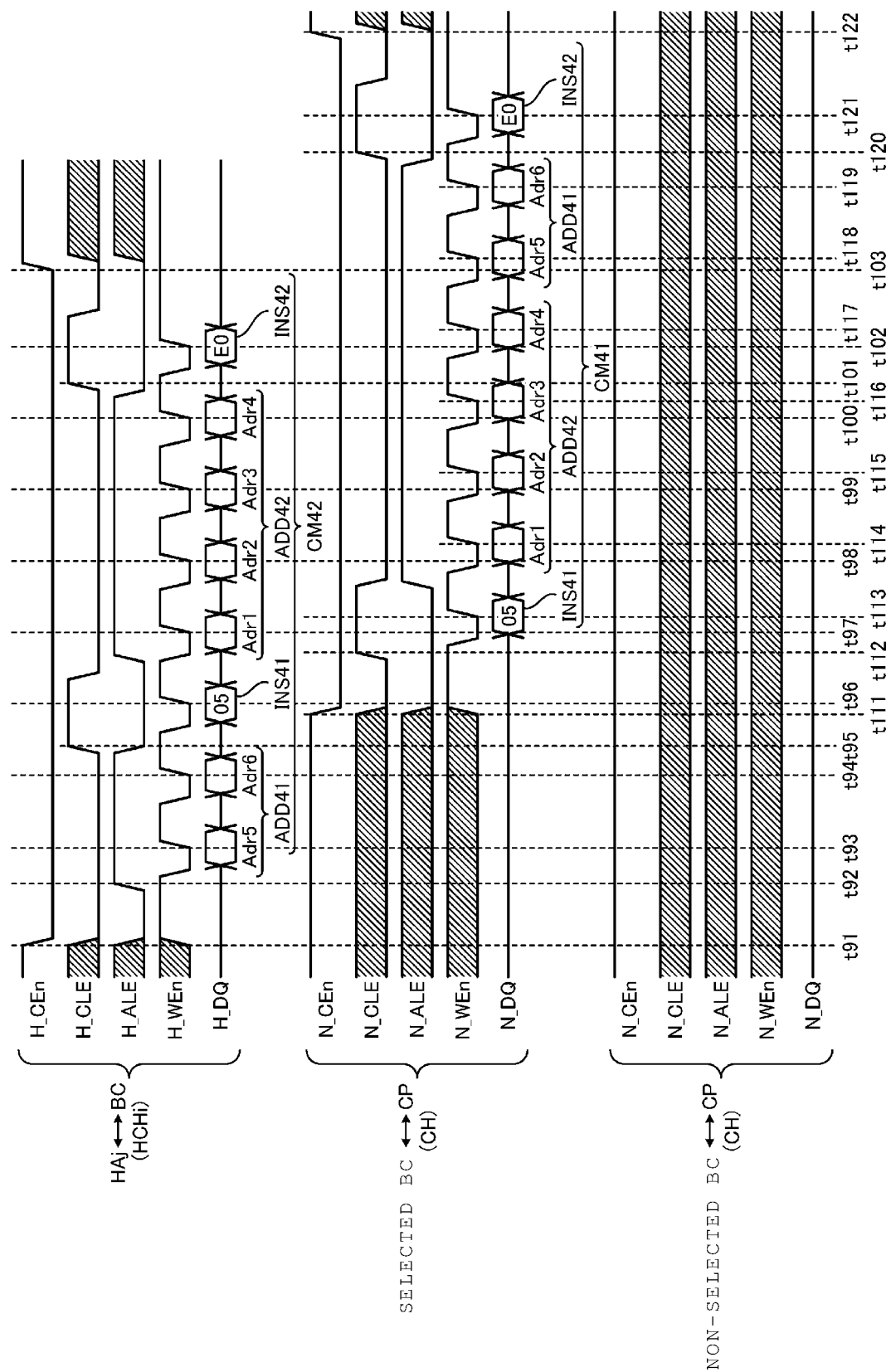
FIG. 13 is a waveform diagram illustrating operations of the semiconductor device according to the sixth modified example of the embodiment.

For example, as illustrated in FIG. 13, operations different from those of the above embodiments in the following aspects are performed. FIG. 13 is a waveform diagram illustrating operations of the host HAj and the semiconductor device 1j according to the sixth modified example.

The host HAj transitions the chip enable signal H_CEn to an active state at a timing t91, and transitions the address latch enable signal H_ALE to an active state at a timing t92. The host HAj transmits the address information ADD41 at timings t93 and t94 after the write enable signal H_WEn is toggled. Specifically, the host HAj transmits the address word Adr5 of the address information ADD41 at the timing t93, and transmits the address word Adr6 of the address information ADD41 at the timing t94. The transmission order of the address words Adr6 and Adr6 may be reversed.

Each of the bridge chip BC1 to BC4 interprets the address information ADD41, and determines whether the own bridge chip BC is designated according to the interpretation result.

For example, when the bridge chip BC1 is designated by the address information ADD41, the bridge chip BC1 determines that the own bridge chip BC is designated, and the bridge chips BC2 to BC4 determine that the own bridge chip BC is not designated. Each of the non-selected bridge chips BC2 to BC4 gates the chip enable signal H_CEn, the command latch enable signal H_CLE, the address latch enable signal H_ALE, the write enable signal H_WEn, and the data signal H_DQ. In addition, each of the non-selected bridge chips BC2 to BC4 sets the chip enable signal N_CEn to a non-active state.

At a timing t95, the host HAj transitions the address latch enable signal H_ALE to a non-active state (L level). Further, the host HAj transitions the command latch enable signal H_CLE to an active state (H level).

After the timing t95, each of the non-selected bridge chips BC2 to BC4 maintains the chip enable signal N_CEn in a non-active state and continues the gating of the chip enable signal H_CEn, the command latch enable signal H_CLE, the address latch enable signal H_ALE, the write enable signal H_WEn, and the data signal H_DQ. The local channels CH3 to CH8 corresponding to the non-selected bridge chips BC2 to BC4 continue to be in a state where each signal does not appear.

On the other hand, the selected bridge chip BC1 operates as follows.

At a timing t11, according to the interpretation result of the address information ADD1, the selected bridge chip BC1 transitions the chip enable signal N_CEn to an active state, and disables the gating of the command latch enable signal H_CLE, the address latch enable signal H_ALE, the write enable signal H_WEn, and the data signal H_DQ and transitions each of the signals N_CLE, N_ALE, N_WEn, and N_DQ to a non-active state.

The selected bridge chip BC1 interprets each of the signals (the instruction information INS3 and the address information ADD42) transmitted from the host HAj at the timings t95 to t100, delays each of the signals at the first time, and transfers each of the signals to the target memory chip CP via the local channel CH at timings t112 to t117. The first time corresponds to the time from the timing t95 to the timing t112.

The selected bridge chip BC1 interprets the signal (the address information ADD41) transmitted from the host HAj at the timings t93 and t94, delays the signal at the second time, and transfers the signal to the target memory chip CP via the local channel CH at timings t118 and t119. The second time is longer than the first time. The second time corresponds to the time from the timing t93 to the timing t118.

The selected bridge chip BC1 interprets the signal (the instruction information INS4) transmitted from the host HAj at timings t101 to t103, delays the signal at the third time, and transfers the signal to the target memory chip CP via the local channel CH at timings t120 to t122. The third time is longer than the first time and shorter than the second time. The third time corresponds to the time from the timing t101 to the timing t120.

In this manner, with respect to the address information ADD41 that—designates the bridge chip BC, the host HAj changes the order according to the standard in the command CM41 as the command CM42 to a front side (a side to be transmitted first) and transmits the command CM42 to each bridge chip BC via the host channel HCHi. The selected bridge chip BC determined to be selected according to the address information ADD41 switches the order of the address information ADD41 in the command CM42 based on the order (that is, the order of the command CM41), and transfers the command CM41 to the memory chip CP via the local channel CH. Accordingly, the access to the target memory chip CP can be rapidly performed while conforming to the standard.

In these embodiments above, the commands and the address information are transmitted as the data signal H_DQ [7:0], N_DQ[7:0]. However, the commands and the address information may be transmitted through one or more signal lines that are transmitted other signal other than the data signal H_DQ[7:0], N_DQ[7:0]. For examples, the other signal may be the address latch signal H_ALE, N_ALE, the command latch signal H_CLE, N_CLE.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:
1. A semiconductor device comprising:
a plurality of terminals connectable to a host;
first and second bridge chips connected to the plurality of terminals;
a first plurality of chips connected to the first bridge chip; and a second plurality of chips connected to the second bridge chip, wherein the plurality of terminals includes a first terminal through which a first signal designating a bridge chip is transmitted, the first bridge chip is configured to enable signal transmission to at least one of the first plurality of chips when the first signal designates the first bridge chip, and disable the signal transmission to the first plurality of chips when the first signal does not designate the first bridge chip, and the second bridge chip is configured to enable signal transmission to at least one of the second plurality of chips when the first signal designates the second bridge chip, and disable the signal transmission to the second plurality of chips when the first signal does not designate the second bridge chip.

2. The semiconductor device according to claim 1, wherein the plurality of terminals includes a second terminal through which a second signal enabling a bridge chip designation is transmitted, each of the first and second bridge chips is configured to recognize a signal received through the first terminal as the first signal, while the second signal is in an active state.

3. The semiconductor device according to claim 2, wherein the first bridge chip is configured to disable the signal transmission to the first plurality of chips when the second signal for the first bridge chip is in the active state, and the second bridge chip is configured to disable the signal transmission to the second plurality of chips when the second signal for the second bridge chip is in the active state.

4. The semiconductor device according to claim 1, wherein each of the first and second bridge chips is configured to recognize a signal received through the first terminal as the first signal, after a first predetermined command and before a second predetermined command.

5. The semiconductor device according to claim 4, wherein the first bridge chip is configured to disable the signal transmission to the first plurality of chips while the first signal for the first bridge chip is being received, and the second bridge chip is configured to disable the signal transmission to the second plurality of chips while the first signal for the second bridge chip is being received.

6. The semiconductor device according to claim 1, wherein the first bridge chip is configured to transfer an access command received through the first terminal to the at least one of the first plurality of chips when the first signal designates the first bridge chip, and prohibit transferring of access commands to the first plurality of chips when the first signal does not designate the first bridge chip, and the second bridge chip is configured to transfer the access command to the at least one of the second plurality of chips when the first signal designates the second bridge chip, and prohibit transferring of access commands to the second plurality of chips when the first signal does not designate the second bridge chip.

7. The semiconductor device according to claim 1, wherein when signal transmission to the first plurality of chips is enabled, the first bridge chip is configured to broadcast a command received through the first terminal to each of the first plurality of chips, and when signal transmission to the second plurality of chips is enabled, the second bridge chip is configured to broadcast the command to each of the second plurality of chips.

8. The semiconductor device according to claim 1, wherein each of the first plurality of chips comprises a first memory chip, and the signal transmission to the at least one of the first plurality of chips includes transmission of at least one of a write command, a read command, and an erase command to the first memory chip, and each of the second plurality of chips comprises a second memory chip, and the signal transmission to the at least one of the second plurality of chips includes transmission of at least one of a write command, a read command, and an erase command to the first memory chip.

9. The semiconductor device according to claim 1, wherein the first bridge chip includes a first register and the second bridge chip includes a second register, the first bridge chip is configured to enable writing into the first register when the first signal designates the first bridge chip, and disable the writing into the first register when the first signal does not designate the first bridge chip, and the second bridge chip is configured to enable writing into the second register when the first signal designates the second bridge chip, and disable the writing into the second register when the first signal does not designate the second bridge chip.

10. The semiconductor device according to claim 9, wherein when writing into the first register is enabled, the first bridge chip is configured to write control information into the first register in response to a predetermined command received through the first terminal, and when writing into the second register is enabled, the second bridge chip is configured to write control information into the second register in response to the predetermined command received through the first terminal.

11. The semiconductor device according to claim 1, wherein the first signal received through the first terminal is followed by a first instruction to a chip to be accessed and address information indicating the chip to be accessed, in order.

12. The semiconductor device according to claim 11, wherein each of the first and second bridge chips includes a circuit configured to generate a command including the first instruction followed by the address information and the first signal in order, the first bridge chip is configured to transfer the command to each of the first plurality of chips when the signal transmission to the first plurality of chips is enabled by the first signal, and not transfer the command to any of the first plurality of chips when the signal transmission to the first plurality of chips is disabled by the first signal, and the second bridge chip is configured to transfer the command to each of the second plurality of chips when the signal transmission to the second plurality of chips is enabled by the first signal, and not transfer the command to any of the second plurality of chips when the signal transmission to the second plurality of chips is disabled by the first signal.

13. The semiconductor device according to claim 1, wherein
the first plurality of chips is not connected to the second bridge chip, and
the second plurality of chips is not connected to the first bridge chip.

14. A semiconductor device comprising:
a plurality of terminals connectable to a host;
first and second bridge chips commonly connected to the plurality of terminals, the first bridge chip including a first register and the second bridge chip including a second register;
a first plurality of memory chips connected to the first bridge chip; and
a second plurality of memory chips connected to the second bridge chip, wherein
the plurality of terminals includes a first terminal through which a first signal designating a bridge chip is transmitted,
the first bridge chip is configured to enable writing into the first register when the first signal designates the first bridge chip, and disable the writing into the first register when the first signal does not designate the first bridge chip, and
the second bridge chip is configured to enable writing into the second register when the first signal designates the second bridge chip, and disable the writing into the second register when the first signal does not designate the second bridge chip.

15. The semiconductor device according to claim 14, wherein
the plurality of terminals includes a second terminal through which a second signal enabling a bridge chip designation is transmitted,
each of the first and second bridge chips is configured to recognize a signal received through the first terminal while the second signal is in an active state, as the first signal.

16. The semiconductor device according to claim 14, wherein each of the first and second bridge chips is configured to recognize a signal received through the first terminal after a first predetermined command and before a second predetermined command, as the first signal.

17. The semiconductor device according to claim 14, wherein
the first plurality of chips is not connected to the second bridge chip, and
the second plurality of chips is not connected to the first bridge chip.

* * * * *